United States Patent
Yardeni et al.

(10) Patent No.: US 11,681,557 B2
(45) Date of Patent: Jun. 20, 2023

(54) SYSTEMS AND METHODS FOR MANAGING RESOURCES IN A HYPERCONVERGED INFRASTRUCTURE CLUSTER

(71) Applicant: INTERNATIONAL BUSINESS MACHINES CORPORATION, Armonk, NY (US)

(72) Inventors: Guy Yardeni, Boston, MA (US); Aditya Bhat, Boston, MA (US); Ryan McDonald, Boston, MA (US); Nitya Vyas, Jamaica, NY (US); Shravan Sriram, Jersey City, NJ (US); Aditya Deo, Jersey City, NJ (US); Alexander Nish, Boston, MA (US); Wei Duan, New York, NY (US); Rich Hammond, Boston, MA (US); David Ohsie, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 16/945,050

(22) Filed: Jul. 31, 2020

(65) Prior Publication Data
US 2022/0156116 A1 May 19, 2022

(51) Int. Cl.
G06F 9/50 (2006.01)
G06Q 30/0283 (2023.01)
G06F 3/06 (2006.01)

(52) U.S. Cl.
CPC ............ *G06F 9/5027* (2013.01); *G06F 3/067* (2013.01); *G06F 3/0613* (2013.01); *G06F 3/0653* (2013.01); *G06F 3/0659* (2013.01); *G06F 9/5083* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 9,830,192 B1* | 11/2017 | Crouchman | G06Q 30/0601 |
| 9,852,011 B1* | 12/2017 | Yemini | H04L 67/1004 |
| 10,489,215 B1* | 11/2019 | Wen | G06F 11/3442 |
| 11,082,333 B1* | 8/2021 | Lam | H04L 47/803 |
| 11,119,686 B2* | 9/2021 | Danilov | G06F 3/065 |
| 11,216,309 B2* | 1/2022 | Piercey | G06F 9/5016 |
| 11,349,339 B1* | 5/2022 | Streete | G05B 15/02 |
| 11,442,669 B1* | 9/2022 | Frandzel | G06F 3/0619 |
| 2009/0043620 A1* | 2/2009 | Lee | G06F 9/3012 717/144 |
| 2016/0050104 A1* | 2/2016 | Wackerly | H04L 41/0893 370/220 |
| 2019/0068523 A1* | 2/2019 | Chagam Reddy | H05K 7/20736 |
| 2019/0213027 A1* | 7/2019 | Bhandari | G06F 9/505 |

(Continued)

*Primary Examiner* — Adam Lee
(74) *Attorney, Agent, or Firm* — Rakesh Roy

(57) ABSTRACT

Various approaches for managing computational resources in a hyperconverged infrastructure (HCI) cluster include identifying the hosts associated with the HCI cluster for providing one or more computational resources thereto; for each of the hosts, determining a revenue and/or an expense for allocating the computational resource(s) to the HCI cluster; and determining whether to clone, suspend or terminate each host in the HCI cluster based at least in part on the associated revenue and/or expense.

16 Claims, 9 Drawing Sheets

(56) References Cited

U.S. PATENT DOCUMENTS

| | | | |
|---|---|---|---|
| 2019/0227845 A1* | 7/2019 | Sridhar | G06F 9/5044 |
| 2020/0081992 A1* | 3/2020 | Lynch | G06F 16/256 |
| 2020/0104170 A1* | 4/2020 | Else | G06F 9/4887 |
| 2020/0310881 A1* | 10/2020 | Gonzalez | G06F 9/5022 |
| 2021/0011779 A1* | 1/2021 | Fang | G06Q 20/12 |
| 2021/0019159 A1* | 1/2021 | Lu | G06F 9/5027 |
| 2021/0081352 A1* | 3/2021 | Yang | G06F 13/1668 |
| 2021/0149774 A1* | 5/2021 | Denneman | G06F 11/1448 |
| 2021/0173945 A1* | 6/2021 | Karr | H04L 9/14 |
| 2021/0373924 A1* | 12/2021 | Sivaraman | G06F 9/4856 |

* cited by examiner

| Datastore (Cluster1) | ACTIONS ˅ |
|---|---|
| Summary  Monitor  Configure  Permissions  Files  Hosts  VMs | |

▾ More
  Alarm Definitions
  Scheduled Tasks
General
Hardware Acceleration

Properties
| Name | vsanDatastore (Cluster1) |
|---|---|
| Type | vsan |

[REFRESH]

Capacity
| Total Capacity | 39.99 GB |
|---|---|
| Provisioned Space | 36 GB |
| Free Space | 9.4 GB |

202 — (Total Capacity)
204 — (Provisioned Space)

Datastore Capabilities
| › Storage I/O Control | Not supported |
|---|---|

Default Storage Policy
| Policy | vSAN Default Storage Policy |
|---|---|

[EDIT]

FIG. 2

| REPLICATION METHOD | USABLE STORAGE CALCULATION |
|---|---|
| FTT = 0; RAID1 | DIVIDE BY 1 (NOOP) |
| FTT = 1; RAID 1 | DIVIDE BY 2 |
| FTT = 2; RAID 1 | DIVIDE BY 3 |
| FTT = 1; RAID5 | DIVIDE BY 1.33 |
| FTT = 2; RAID6 | DIVIDE BY 1.5 |

FIG. 3

SYSTEMS AND METHODS FOR MANAGING RESOURCES IN A HYPERCONVERGED INFRASTRUCTURE CLUSTER

FIELD OF THE INVENTION

The present invention relates, generally, to hyperconverged infrastructure (HCI) clusters, and more particularly to systems and methods for managing computational resources in HCI clusters.

BACKGROUND

Traditional computer system architectures often include a dedicated storage area network (SAN). The storage area network may be implemented using SAN specific networking technologies including Fibre Channel and dedicated highly reliable storage arrays to provide storage. This dedicated set of resources and technologies can provide and independently manage storage architecture dedicated to providing highly available and resilient storage for compute workloads.

This traditional SAN architecture, with its specialized and dedicated hardware has three disadvantages. First, it resists the trend towards increased virtualization where all infrastructure is shared and resources are dedicated dynamically to whatever workload demands exist at the moment; SAN resources are reserved for storage operations only. Second, dedicated technologies are more expensive than commoditized compute systems connected over TCP/IP. Third, provisioning and management of applications in the traditional SAN architecture requires coordination between the compute and storage teams who manage different parts of the system.

Software defined storage (SDS) systems can help alleviate these problems by providing highly reliable storage systems based on commodity hardware and networking platforms. In this architecture, storage arrays are replaced with a software control plane managing commodity compute hardware with direct attached storage (DAS) connected by a TCP/IP networking stack. Additional storage resources can be added dynamically by provisioning additional hardware and putting it under control of the SDS control plane. SDS eliminates the sharp division of storage and compute resources implied by the SAN architecture. In addition, the software control layer helps enable integration between compute and storage provisioning via the software control plane.

SDS can be deployed as a two-layer system or as hyperconverged infrastructure (HCI). In a two-layer system, the compute and storage systems are implemented on distinct hosts. Those hosts dedicated to storage will contain sufficient DAS to supply the needs of the storage system while hosts dedicated to compute will be configured for those workloads, and compute hosts will consume their storage from the storage hosts. Alternatively SDS can be deployed as part of an HCI. In an HCI deployment, the compute workloads are placed on the same hosts which supply the storage. Thus a single cluster of hosts supply both the storage and compute resources needed to run workloads.

HCI also invites the notion that the compute virtualization system and SDS control plan can be combined into a single software package managing both the compute and storage resources and workload on the unified cluster. For example, VMware implements an HCI software stack that includes a vSAN datastore for storage, vSphere for compute virtualization, and vCenter for virtual infrastructure management.

SDS and HCI provide both opportunities and challenges in ensuring that infrastructure resources are sufficient resources to meet the performance demands of the compute workloads that depend on it. Because an SDS can be easily scaled out by adding additional hosts with DAS to the system, it becomes for a resource management system to monitor the overall storage needs of the workloads and either forecast or directly provision the necessary resource to prevent application performance from suffering due to infrastructure resource constraints. However, this also places greater analysis demand on a resource analysis system. While the traditional SAN architecture typically hides the implementation details of a storage device, which the resource management system then treats as a "black box", the SDS must be analyzed more carefully so that usable storage resources available to the workloads can be derived from the underlying architecture of the SDS.

For example, VMware vSAN may report storage information such as the "raw" capacity and "raw" free space associated with the vSAN storage volume to the user. However, such information does not necessarily equate to the "actual usable" storage space and "actual free" storage space available to the user. For example, user policy settings and preferences (including the storage policy for the replication method) and/or the anticipated compression ratio on the unused storage are not taken into account in the reported "raw" capacity and the "raw" free space. Also, space is not reserved for anticipated maintenance which will remove raw storage from use on a temporary basis nor for sufficient spare capacity needed by vSAN to balance storage across hosts for best performance. As a result, the actual usable space and actual free space for use may be significantly less than the reported information. This misleading information may cause the user to exhaust the storage capacity of the datastore, leaving the storage in an unprotected state by maintenance operations or reduce the throughput and increase the latency of the storage by forcing it to become unbalanced. The same considerations can apply to other metrics such as throughput (IOPs).

A need thus exists for a resource management system that computes the actual usable storage space and/or actual free space (or other metrics) available for use in a datastore of an HCI cluster, thereby ensuring optimal performance of the HCI cluster.

SUMMARY

The present invention relates to approaches for computing the actual (or effective) usable storage space and/or actual (or effective) free space or other resource limits available for use in a datastore of an HCI cluster based on the raw information (e.g., raw storage capacity or raw free space) provided by the datastore and user policy settings and preferences for storage in the datastore. As used herein, the term "raw" information refers to information originally acquired from the SDS control plane (e.g., vSAN) without taking into account the user policy settings, and the "actual" or "effective" information (e.g., actual usable storage or actual free space) refers to information computed by a management system based on the raw information provided by the datastore and the user policy settings. The terms "actual" and "effective" are used herein interchangeably.

In various embodiments, upon receiving the raw storage information from the datastore, the management system automatically accesses a database storing user policy settings to retrieve the data therein. The user policy settings may include, for example, a default storage policy specifying a replication approach and HCI storage policies such as the amount of raw storage to be reserved as slack space (slack space percentage), the number of hosts that can be put into maintenance while retaining full redundancy (host capacity reservation) and/or the anticipated deduplication and/or compression ratio on the remaining storage. The deduplication and compression ratios can also be estimated based on the data already stored on the device. Based on the received raw storage information and the retrieved user policy settings, the management system may compute the actual usable storage and actual free space in the datastore and, based thereon, determine whether the storage is over-utilized or under-utilized. If the storage is over-utilized, the management system may compute the additional storage volume required for relieving the over-utilized situation and then, based thereon, determine the number of hosts that should be added in the HCI cluster in order to provide the determined additional storage volume. In one embodiment, the management system represents computational resources in econometric terms, e.g., in terms of the value to a consumer of the resources and the attributable cost to a host of providing them. Value and cost may be defined in a manner appropriate to a deployment and management priorities; value and cost may, for example, be expressed in terms of a real or virtual currency, with the consumer providing "revenue" to a provider, with the attributable cost treated as an "expense." It should be emphasized that revenue and expense need not reflect actual monetary expenditures and realizations. The expense, for example, of providing resources may indeed reflect actual marginal cost and a share of overhead, but may also (or alternatively) reflect traditionally nonmonetary considerations such as load balancing and the ability to sustain quality-of-service commitments to other consumers. Revenue—i.e., the "purchase" of resources—may reflect commitment of a portion of the value that the business ascribes to a particular workload, which may have an associated "budget," rather than an actual payment of money. For management purposes, however, it is often convenient to "book" resource deployments in terms of revenue transfers (e.g., from an application or workload to a host) and incurred expenses to ensure that those deployments reflect greatest overall efficiency and to assess when to commit new physical resources. The more the concepts of attributed revenue and expense map to real-world value and cost, the more economic justification will underlie physical procurement decisions.

In addition, the revenue and expense may continuously change to reflect the utilization rate of the computational resources (e.g., a processor, memory, network, storage). For example, the price offered by a computational resource provider may monotonically increase with a growing utilization rate of the resource. Because the revenue is determined by multiplying the offered price with the utilized quantity of the resource, the revenue may increase as the utilization rate (and thereby the price) of the resource grows. Similar situations may apply to the expense as well.

The management system computes the revenue and/or expense associated with each host for contributing the storage to the datastore and, based thereon, identifies the host(s) whose revenue is larger than the expense by a predetermined factor (e.g., twice, five times or ten times). This means that the existing deployments of host resources are "profitable" and therefore efficient from a resource-management perspective to a degree specified by the predetermined factor. As a result, the management system may automatically clone or provision the identified host(s) to provide the additional storage volume. In another embodiment, the management system may solicit "purchase prices" from multiple hosts offering the additional storage volume, and based thereon, select the host(s) offering the lowest price. Again, the management system may then automatically provision the selected host(s) to provide the additional storage volume or clone the host(s) if the cloning criteria (as described above) are satisfied. If, however, the storage is under-utilized, the management system may identify the host(s) whose expense is larger than its revenue by a predetermined factor (e.g., twice, five times or ten times) and, based thereon, suspend or terminate the host(s) so as to scale down the storage in the datastore of the HCI cluster. Over time, this ongoing pruning of host deployments will avoid physical procurements that are not cost-justified.

In some embodiments, the management system scales up or down the storage based on the revenue(s) and/or expense(s) associated with the host(s) only, independent of the utilization of the storage (e.g., whether the storage is over-utilized or under-utilized). For example, the management system may continuously monitor the revenue and/or expense for each host providing storage in the HCI cluster. If the revenue received by a host is larger than its attributable expenses by a predetermined factor (e.g., twice, five times or ten times), the management system may clone the host to provide additional compute resources (e.g., storage), thereby expanding the datastore. Conversely, if the expense for a host is larger than the revenue by the predetermined factor, the management system may suspend or terminate the host to reduce the supply of the compute resources (e.g., storage), thereby contracting the datastore. In addition, when the management system determines that it is inexpensive to operate a particular datacenter (based on, for example, the ratio of the revenue to the expense), one or more hosts may be added to expand the datastore since the expenses are small. Conversely, when the management system determines that the datacenter is expensive to operate (e.g., due to an increase in the expenses), the management system may not add additional host(s) to expand the datastore even if the storage is over-utilized. In other words, utilization may be based on economic factors other than supply and demand.

In some embodiments, the management system may expand the HCI cluster so as to allow an additional workload to be executed therein. For example, upon receiving the additional workload, the management system may determine the size demands in terms of computational resource(s) for executing the additional workload in the HCI cluster. In one embodiment, the demands include a direct demand on the host(s) for directly providing the computational resources (e.g., memory) to execute the workload and an indirect demand on the host(s) for indirectly providing the computational resource (e.g., storage) via the datastore in the HCI cluster to execute the additional workload. Based thereon, the management system may determine how many hosts to add to the HCI cluster in order to satisfy both direct and indirect demand. Again, the management system may then clone and/or provision the hosts to provide the demanded resources based on their offering price or associated revenues and/or expenses. As used herein, the term "indirect demand" refers to the demand on the computational resource(s) that is contributed by the hosts to be pooled in the datastore for sharing between different virtual machines (or containers), and the term "direct demand" refers to the demand on the computational resource(s) that is contributed by the hosts but not pooled in the datastore.

In some embodiments, the management system may migrate a workload, a host and/or storage from a non-HCI cluster to an HCI cluster or between HCI clusters. For example, upon receiving a user's request to migrate a workload and/or a host from a non-HCI cluster or a first HCI cluster to a second HCI cluster, the management system may retrieve, from a database, a user-specified template for a host configuration (of the hosts in the second HCI cluster); the template typically specifies the quantity (e.g., the capacity) of each computational resource (e.g., CPU, memory, raw storage amount, IOPS, etc.) provided by the hosts. The management system may then compute the demand on each of the computational resources to execute the workload in the non-HCI cluster or the first cluster. Based on the computed demands and the quantities of computational resources specified in the template, the management system may determine the number of hosts that can satisfy the demand for computational resources. The management system may then select this number of hosts (or at least some of them) from the existing hosts in the non-HCI cluster (or the first HCI cluster) and/or new hosts that are not in the non-HCI cluster (or the first HCI cluster) based on, for example, their associated revenues and expenses, and automatically migrate the selected hosts (and thereby the storage) to the second HCI cluster. Subsequently, the management system may migrate the workload from the non-HCI cluster (of the first HCI cluster) to the second HCI cluster.

Accordingly, in one aspect, the invention pertains to a method of managing computational resources (e.g., a processor, a memory, a storage, a network I/O resource and/or I/O pathways) in an HCI cluster. In various embodiments, the method includes (a) identifying multiple hosts associated with the HCI cluster for providing one or more computational resources thereto; (b) for each of the hosts, determining a revenue and/or an expense for allocating the computational resource(s) to the HCI cluster; and (c) determining whether to clone, suspend or terminate each host in the HCI cluster based at least in part on the associated revenue and/or expense. In one implementation, the method further includes causing the hosts to be cloned, suspended or terminated in the HCI cluster based on the determination in step (c).

Additionally, the method may further include, upon determining that the revenue of the first one of the hosts is larger than the expense thereof by a predetermined factor, cloning the first one of the hosts. In one embodiment, the method further includes, upon determining that the expense of the second one of the hosts is larger than the revenue thereof by a predetermined factor, suspending or terminating the second one of the hosts. The revenue associated with each of the hosts may be generated by causing a workload to be executed in the HCI cluster using the computational resource(s), and the expense associated with each of the hosts may be generated by allocating the computational resource(s) from the host to the HCI cluster for executing the workload. In some embodiments, the revenue associated with each of the hosts is determined based at least in part on a unit price associated with the computational resource(s) and a quantity of the computational resource(s) contributed each of the hosts to the HCI cluster. Additionally, the revenue and/or expense associated with each host may be determined based on an average of the revenue and/or expense over a predetermined period of time.

In various embodiments, the revenue associated with each of the hosts may be generated by causing a workload to utilize storage contributed by the host and the expense associated with each of the hosts may be generated by allocating the storage from the host to a datastore in the HCI cluster. The storage includes a storage amount and/or an input/output operations per second (IOPS) capacity. In one embodiment, the datastore includes a VSAN datastore.

In another aspect, the invention relates to a computer system having a management system for managing computational resources (e.g., a processor, a memory, a storage I/O resource, a network I/O resource and/or I/O pathways) in an HCI cluster. In various embodiments, the management system is configured to (a) identify multiple hosts associated with the HCI cluster for providing one or more computational resources thereto; (b) for each of the hosts, determine a revenue and/or an expense for allocating the computational resource(s) to the HCI cluster; and determine whether to clone, suspend or terminate each host in the HCI cluster based at least in part on the associated revenue and/or expense. In one implementation, the management system is further configured to cause the hosts to be cloned, suspended or terminated in the HCI cluster based on the determination in step (c).

Additionally, the management system may be further configured to, upon determining that the revenue of the first one of the hosts is larger than the expense thereof by a predetermined factor, clone the first one of the hosts. In one embodiment, the management system is further configured to, upon determining that the expense of the second one of the hosts is larger than the revenue thereof by a predetermined factor, suspend or terminate the second one of the hosts. The revenue associated with each of the hosts may be generated by causing a workload to be executed in the HCI cluster using the computational resource(s), and the expense associated with each of the hosts may be generated by allocating the computational resource(s) from the host to the HCI cluster for executing the workload. In some embodiments, the revenue associated with each of the hosts is determined based at least in part on a unit price associated with the computational resource(s) and a quantity of the computational resource(s) contributed each of the hosts to the HCI cluster. Additionally, the revenue and/or expense associated with each host may be determined based on an average of the revenue and/or expense over a predetermined period of time.

In various embodiments, the revenue associated with each of the hosts is generated by causing a workload to utilize storage contributed by the host, and the expense associated with each of the hosts is generated by allocating the storage from the host to a datastore in the HCI cluster. The storage may include a storage amount and/or an IOPS capacity. In addition, the datastore may include a VSAN datastore.

Another aspect of the invention relates to a method of managing computer resources including storage in an HCI cluster. In various embodiments, the method includes (a) receiving, from the HCI cluster, data indicative of a raw capacity and a raw free space associated with the storage, the raw capacity corresponding to a maximal amount of space in the storage and the raw free space corresponding to an estimate of free space remaining in the storage; (b) retrieving, from a database, a user policy setting for storage in the HCI cluster; (c) based at least in part on the raw capacity and the raw free space received in step (a) and the user policy setting retrieved in step (b), determining an effective usable storage and an effective free space remaining in the storage; (d) based on the effective free space and the effective usable storage, computing an effective utilization rate of the storage; and (e) based at least in part on the effective utilization rate and a target utilization rate, scaling up or down the storage in the HCI cluster.

The user policy setting may include (i) a storage policy for a replication approach, (ii) a number of hosts in the HCI cluster reserved for maintenance, (iii) a slack-space percentage and/or (iv) a compression or deduplication ratio. In one embodiment, the effective usable storage satisfies an equation:

$$\text{effective } usuable \text{ storage} = \frac{\text{raw capacity} - HCR \times RS}{RF} \times (1 - SSP) \times CR$$

where HCR represents the number of hosts in the HCI cluster reserved for maintenance; RS denotes a raw space contributed by a largest host in the HCI cluster; RF denotes a replication factor associated with the replication approach; SSP denotes the slack space percentage; and CR denotes the compression ratio.

In addition, the method may further include retrieving, from the HCI cluster, a current compression ratio and, based thereon, predicting a compression ratio on the free space remaining in the storage; the effective usable storage and effective free space remaining in the storage may be determined based at least in part on the predicted compression ratio. In some embodiments, the method further includes computing a used storage based at least in part on the raw capacity and the raw free space associated with the storage received in step (a) and the user policy setting retrieved in step (b); the effective free space remaining in the storage is determined by subtracting the used storage from the effective usable storage. In one implementation, the used storage satisfies an equation:

$$\text{used storage} = \frac{\text{raw capacity} - \text{raw free space}}{RF} \times CR$$

where RF denotes a replication factor associated with the replication approach and CR denotes the compression ratio.

Additionally, the method may further include, upon determining that the effective utilization rate is larger than the target utilization rate, determining additional storage to be added to the storage such that the effective utilization rate is equal to or below the target utilization rate. The additional storage may be determined based at least in part on a user policy setting including (i) a storage policy for a replication approach, (ii) a number of hosts in the HCI cluster reserved for maintenance, (iii) a slack-space percentage and/or (iv) a compression or deduplication ratio.

Further, the method may further include, based on the determined additional storage, computing a number of hosts to be cloned or provisioned for providing the additional storage. In one embodiment, the method further includes determining a revenue and/or an expense associated with each of multiple hosts for allocating its storage to the HCI cluster; and selecting the number of hosts to be cloned or provisioned based at least in part on the associated revenues and/or expenses. In addition, the method may further include cloning or provisioning the selected number of hosts. In some embodiments, the revenues of the selected number of hosts are larger than the expenses thereof by a predetermined factor. Additionally or alternatively, the number of hosts to be cloned or provisioned may be further computed based at least in part on a demand of the second computer resource (e.g., a processor, a memory, a network I/O resource, or I/O pathways), different from the storage, and a supply of the second computer source by the hosts.

In various embodiments, the method further includes receiving, from multiple hosts, prices for purchasing the additional storage; based at least in part on the prices, selecting the number of hosts to be cloned or provisioned; and automatically cloning or provisioning the selected number of hosts to provide the additional storage. In one implementation, the selected number of hosts offer lower prices than the unselected ones. In addition, the method may further include, upon determining that the effective utilization rate is smaller than the target utilization rate, suspending or terminating one or more hosts in the HCI cluster. The method may further include determining the host(s) to be suspended or terminated based at least in part on revenues and expenses associated therewith for allocating their storage to the HCI cluster. For example, the expense(s) of the determined host(s) to be suspended or terminated may be larger than the revenue thereof by a predetermined factor. The method may further include suspending or terminating the determined one or more hosts. In one implementation, the storage is in a datastore including VSAN.

In yet another aspect, a computer system for managing computer resources including storage in an HCI cluster having a management system configured to (a) receive, from the HCI cluster, data indicative of a raw capacity and a raw free space associated with the storage, the raw capacity corresponding to a maximal amount of space in the storage and the raw free space corresponding to an estimate of free space remaining in the storage; (b) retrieve, from a database, a user policy setting for storage in the HCI cluster; (c) based at least in part on the raw capacity and the raw free space associated with the storage received in step (a) and the user policy setting retrieved in step (b), determine an effective usable storage and an effective free space remaining in the storage; (d) based on the effective free space and the effective usable storage, compute an effective utilization rate of the storage; and (e) based at least in part on the effective utilization rate and a target utilization rate, scale up or down the storage in the HCI cluster.

The user policy setting may include (i) a storage policy for a replication approach, (ii) a number of hosts in the HCI cluster reserved for maintenance, (iii) a slack-space percentage and/or (iv) a compression or deduplication ratio. In one embodiment, the effective usable storage satisfies an equation:

$$\text{effective } usuable \text{ storage} = \frac{\text{raw capacity} - HCR \times RS}{RF} \times (1 - SSP) \times CR$$

where HCR represents the number of hosts in the HCI cluster reserved for maintenance; RS denotes a raw space contributed by a largest host in the HCI cluster; RF denotes a replication factor associated with the replication approach; SSP denotes the slack space percentage; and CR denotes the compression ratio.

In addition, the management system may be further configured to retrieve, from the HCI cluster, a current compression ratio and, based thereon, predict a compression ratio on the free space remaining in the storage; the effective usable storage and effective free space remaining in the storage may be determined based at least in part on the predicted compression ratio. In some embodiments, the management system is further configured to compute a used storage based at least in part on the raw capacity and the raw free space associated with the storage received in step (a) and the user policy setting retrieved in step (b); the effective free space remaining in the storage is determined by subtracting the used storage from the effective usable storage. In one implementation, the used storage satisfies an equation:

$$\text{used storage} = \frac{\text{raw capacity} - \text{raw free space}}{RF} \times CR$$

where RF denotes a replication factor associated with the replication approach and CR denotes the compression ratio.

Additionally, the management system may be further configured to, upon determining that the effective utilization rate is larger than the target utilization rate, determine additional storage to be added to the storage such that the effective utilization rate is equal to or below the target utilization rate. The additional storage may be determined based at least in part on a user policy setting including (i) a storage policy for a replication approach, (ii) a number of hosts in the HCI cluster reserved for maintenance, (iii) a slack-space percentage and/or (iv) a compression or deduplication ratio.

Further, the management system may be further configured to, based on the determined additional storage, compute a number of hosts to be cloned or provisioned for providing the additional storage. In one embodiment, the management system is further configured to determine a revenue and/or an expense associated with each of multiple hosts for allocating its storage to the HCI cluster; and select the number of hosts to be cloned or provisioned based at least in part on the associated revenues and/or expenses. In addition, the management system may be further configured to clone or provision the selected number of hosts. In some embodiments, the revenues of the selected number of hosts are larger than the expenses thereof by a predetermined factor. Additionally or alternatively, the number of hosts to be cloned or provisioned may be further computed based at least in part on a demand of the second computer resource (e.g., a processor, a memory, a network I/O resource and/or I/O pathways), different from the storage, and a supply of the second computer source by the hosts.

In various embodiments, the management system is further configured to receive, from multiple hosts, prices for purchasing the additional storage; based at least in part on the prices, select the number of hosts to be cloned or provisioned; and automatically clone or provision the selected number of hosts to provide the additional storage. In one implementation, the selected number of hosts offer lower prices than the unselected ones. In addition, the management system may be further configured to, upon determining that the effective utilization rate is smaller than the target utilization rate, suspend or terminate one or more hosts in the HCI cluster. The management system may be further configured to determine the host(s) to be suspended or terminated based at least in part on revenues and expenses associated therewith for allocating their storage to the HCI cluster. For example, the expense(s) of the determined host(s) to be suspended or terminated may be larger than the revenue thereof by a predetermined factor. The management system may be further configured to suspend or terminate the determined one or more hosts. In one implementation, the storage is in a datastore including VSAN.

Still another aspect of the invention relates to a method of managing computer resources in an HCI cluster including multiple hosts. In various embodiments, the method includes (a) receiving a workload to be performed in the HCI cluster; (b) determining (i) the first demand on the hosts for directly providing the first type of the computer resources and (ii) the second demand on the hosts for indirectly providing the second type of computer resources via a datastore in the HCI cluster so as to perform the workload; (c) determining the first number of the hosts to be cloned or the second number of new hosts to be provisioned so as to satisfy the first and second demands; and (d) causing the first number of hosts to be cloned or the second number of new hosts to be provisioned.

The method may further include (d) determining the first number of the hosts to be cloned or the first number of the new hosts to be provisioned so as to satisfy the first demand; and (e) determining the second number of the hosts to be cloned or the second number of the new hosts to be provisioned so as to satisfy the second demand; the number of the hosts to be cloned or the number of the new hosts to be provisioned in step (c) may be determined based on the greater of the first or second numbers determined in steps (d) and (e).

In one implementation, the datastore includes a VSAN datastore and the second type of the computer resources includes storage. In addition, the first type of the computer resources may include a processor, a memory, a network I/O resource and/or I/O pathways. In various embodiments, the method further includes determining a revenue and/or an expense associated with each of the hosts to be cloned and each of the new hosts to be provisioned for providing the first and second types of the computer resources to the HCI cluster; and selecting the number of the hosts to be cloned or the number of the new hosts to be provisioned based at least in part on their associated revenues and/or expenses. In addition, the method further includes cloning the selected number of the hosts or provisioning the selected number of the new hosts. In one embodiment, the revenues of the selected number of the hosts to be cloned or the selected number of the new hosts to be provisioned are larger than the expenses thereof by a predetermined factor.

In some embodiments, the method further includes receiving, from each of the hosts, a price for providing the first type and/or the second type of the computer resources so as to satisfy the first and/or second demand; based at least in part on the prices, automatically selecting the number of the hosts to be cloned; and cloning the selected number of the hosts. In one implementation, the selected number of the hosts offer lower prices than the unselected ones. In addition, the method may further include receiving, from multiple new hosts, prices for providing the first type and/or the second type of the computer resources so as to satisfy the first and/or second demand; based at least in part on the prices, automatically selecting, from the new hosts, the number of the new hosts to be provisioned; and provisioning the selected number of the new hosts. In one implementation, the selected number of the new hosts offer lower prices than the unselected ones.

In another aspect, the invention relates to a computer system for managing computer resources in an HCI cluster including multiple hosts. In various embodiments, the computer system includes a management system configured to (a) receive a workload to be performed in the HCI cluster; (b) determine (i) the first demand on the hosts for directly providing the first type of the computer resources and (ii) the second demand on the hosts for indirectly providing the second type of computer resources via a datastore in the HCI cluster so as to perform the workload; (c) determine the first number of the hosts to be cloned or the second number of new hosts to be provisioned so as to satisfy the first and second demands; and (d) cause the first number of hosts to be cloned or the second number of new hosts to be provisioned.

The management system may be further configured to (d) determine the first number of the hosts to be cloned or the first number of the new hosts to be provisioned so as to satisfy the first demand; and (e) determine the second number of the hosts to be cloned or the second number of the new hosts to be provisioned so as to satisfy the second demand; the number of the hosts to be cloned or the number of the new hosts to be provisioned in step (c) may be determined based on the greater of the first or second numbers determined in steps (d) and (e).

In one implementation, the datastore includes a VSAN datastore and the second type of the computer resources includes storage. In addition, the first type of the computer resources may include a processor, a memory, a network I/O resource and/or I/O pathways. In various embodiments, the management system is further configured to determine a revenue and/or an expense associated with each of the hosts to be cloned and each of the new hosts to be provisioned for providing the first and second types of the computer resources to the HCI cluster; and select the number of the hosts to be cloned or the number of the new hosts to be provisioned based at least in part on their associated revenues and/or expenses. In addition, the management system may be further configured to clone the selected number of the hosts or provision the selected number of the new hosts. In one embodiment, the revenues of the selected number of the hosts to be cloned or the selected number of the new hosts to be provisioned are larger than the expenses thereof by a predetermined factor.

In some embodiments, the management system is further configured to receive, from each of the hosts, a price for providing the first type and/or the second type of the computer resources so as to satisfy the first and/or second demand; based at least in part on the prices, automatically select the number of the hosts to be cloned; and clone the selected number of the hosts. In one implementation, the selected number of the hosts offer lower prices than the unselected ones. In addition, the management system may be further configured to receive, from multiple new hosts, prices for providing the first type and/or the second type of the computer resources so as to satisfy the first and/or second demand; based at least in part on the prices, automatically select, from the new hosts, the number of the new hosts to be provisioned; and provision the selected number of the new hosts. In one implementation, the selected number of the new hosts offer lower prices than the unselected ones.

In another aspect, the invention relates to a method of migrating a host and/or a workload from a non-hyperconverged infrastructure (non-HCI) cluster to an HCI cluster. In various embodiments, the method includes (a) receiving a user specified template for a host configuration of hosts in the HCI cluster, the template specifying a quantity of one or more computer resources (e.g., a processor, a memory, a storage resource, a network I/O resource and/or I/O pathways) provided by the hosts; (b) computing a demand on the computer resource(s) for performing the workload in the non-HCI cluster; (c) based at least in part on the demand and the quantity of the computer resource(s) specified in the template, determining a number of hosts in the HCI cluster required for satisfying the demand; and (d) dedicating the determined number of hosts in the HCI cluster to execution of the demand.

The template may specify multiple quantities, each associated with one of the computer resources provided by the hosts in the HCI cluster. In addition, the method may further include (d) for each of the computer resources, computing a corresponding demand for performing the workload in the non-HCI cluster; and (e) based on the quantity specified with each of the computer resources and the corresponding demand on each of the computer resources for performing the workload, determining a corresponding number of hosts in the HCI cluster for satisfying the corresponding demand on each of the computer resources. In one embodiment, the number of the hosts determined in step (c) is based on the greatest of the corresponding number of the hosts determined in step (e).

In various embodiments, the number of the hosts determined in step (c) is further based on a user policy setting. The user policy setting may include (i) a storage policy for a replication approach, (ii) a number of hosts in the HCI cluster reserved for maintenance, (iii) a slack-space percentage and/or (iv) a compression or deduplication ratio. In addition, the number of the hosts determined in step (c) may be further based on a target utilization rate of the computer resource(s) in the HCI cluster.

Additionally, the method may further include selecting the determined number of hosts in the non-HCI cluster; and migrating the selected number of hosts from the non-HCI cluster to the HCI cluster. In one embodiment, the method further includes, thereafter, migrating the workload from the non-HCI cluster to the HCI cluster. In some embodiments, the method further includes determining a revenue and/or an expense associated with each host in the non-HCI cluster; and selecting the number of the hosts to be migrated from the non-HCI cluster to the HCI cluster based at least in part on the associated revenues and/or expenses. In one implementation, the expenses of the selected number of the hosts to be migrated from the non-HCI cluster to the HCI cluster are larger than the revenues thereof by a predetermined factor.

In still another aspect, a computer system for migrating a host and/or a workload from a non-HCI cluster to an HCI cluster including a management system that is configured to (a) receive a user specified template for a host configuration of hosts in the HCI cluster, the template specifying a quantity of one or more computer resources (e.g., a processor, a memory, a storage resource, a network I/O resource and/or I/O pathways) provided by the hosts; (b) compute a demand on the computer resource(s) for performing the workload in the non-HCI cluster; (c) based at least in part on the demand and the quantity of the computer resource(s) specified in the template, determine a number of hosts in the HCI cluster required for satisfying the demand; and (d) cause the determined number of hosts in the HCI cluster to be dedicated to execution of the demand.

The template specifies multiple quantities, each associated with one of the computer resources provided by the hosts in the HCI cluster. In addition, the management system may be further configured to (d) for each of the computer resources, compute a corresponding demand for performing the workload in the non-HCI cluster; and (e) based on the quantity specified with each of the computer resources and the corresponding demand on each of the computer resources for performing the workload, determine a corresponding number of hosts in the HCI cluster for satisfying the corresponding demand on each of the computer resources. In one embodiment, the number of the hosts determined in step (c) is based on the greatest of the corresponding number of the hosts determined in step (e).

In various embodiments, the number of the hosts determined in step (c) is further based on a user policy setting.

The user policy setting may include (i) a storage policy for a replication approach, (ii) a number of hosts in the HCI cluster reserved for maintenance, (iii) a slack-space percentage and/or (iv) a compression or deduplication ratio. In addition, the number of the hosts determined in step (c) may be further based on a target utilization rate of the computer resource(s) in the HCI cluster.

Additionally, the management system may be further configured to select the determined number of hosts in the non-HCI cluster; and migrate the selected number of hosts from the non-HCI cluster to the HCI cluster. In one embodiment, the management system is further configured to, thereafter, migrate the workload from the non-HCI cluster to the HCI cluster. In some embodiments, the management system is further configured to determine a revenue and/or an expense associated with each host in the non-HCI cluster; and select the number of the hosts to be migrated from the non-HCI cluster to the HCI cluster based at least in part on the associated revenues and/or expenses. In one implementation, the expenses of the selected number of the hosts to be migrated from the non-HCI cluster to the HCI cluster are larger than the revenues thereof by a predetermined factor.

In another aspect, the invention pertains to a method of migrating a storage resource from a non-HCI cluster to an HCI cluster. In various embodiments, the method includes (a) receiving a user specified template for a host configuration of hosts in the HCI cluster, the template specifying a quantity of the storage resource provided by the hosts; (b) computing a demand on the storage resource for performing a workload in the non-HCI cluster; (c) based at least in part on the demand and the quantity of the storage resource specified in the template, determining a number of hosts in the HCI cluster required for satisfying the demand; and (d) dedicating the determined number of hosts in the HCI cluster to execution of the demand. In one implementation, the storage resource includes a storage amount and/or an IOPS capacity.

In addition, the number of the hosts determined in step (c) may be further based on a user policy setting. The user policy setting may include (i) a storage policy for a replication approach, (ii) a number of hosts in the HCI cluster reserved for maintenance, (iii) a slack-space percentage and/or (iv) a compression or deduplication ratio. In some embodiments, the number of the hosts determined in step (c) is further based on a target utilization rate of the storage resource in the HCI cluster. Further, the method may further include selecting the determined number of hosts in the non-HCI cluster; and migrating the selected number of hosts from the non-HCI cluster to the HCI cluster.

In various embodiments, the method further includes determining a revenue and/or an expense associated with each host in the non-HCI cluster; the determined number of hosts is selected based at least in part on the associated revenues and/or expenses. In one implementation, the expenses of the selected number of hosts to be migrated from the non-HCI cluster to the HCI cluster are larger than the revenues thereof by a predetermined factor. In addition, the storage resource may be in a datastore including VSAN.

Another aspect of the invention relates to a computer system for migrating a host and/or a workload from a non-HCI cluster to an HCI cluster. In various embodiments, the computer system includes a management system configured to (a) receive a user specified template for a host configuration of hosts in the HCI cluster, the template specifying a quantity of the storage resource provided by the hosts; (b) compute a demand on the storage resource for performing the workload in the non-HCI cluster; (c) based at least in part on the demand and the quantity of the storage resource specified in the template, determine a number of hosts in the HCI cluster required for satisfying the demand; and (d) dedicate the determined number of hosts in the HCI cluster to execution of the demand. In one implementation, the storage resource includes a storage amount and/or an IOPS capacity.

In addition, the number of the hosts determined in step (c) may be further based on a user policy setting. The user policy setting may include (i) a storage policy for a replication approach, (ii) a number of hosts in the HCI cluster reserved for maintenance, (iii) a slack-space percentage and/or (iv) a compression or deduplication ratio. In some embodiments, the number of the hosts determined in step (c) is further based on a target utilization rate of the storage resource in the HCI cluster. Further, the management system may be further configured to select the determined number of hosts in the non-HCI cluster; and migrate the selected number of hosts from the non-HCI cluster to the HCI cluster.

In various embodiments, the management system is further configured to determine a revenue and/or an expense associated with each host in the non-HCI cluster; the determined number of hosts is selected based at least in part on the associated revenues and/or expenses. In one implementation, the expenses of the selected number of hosts to be migrated from the non-HCI cluster to the HCI cluster are larger than the revenues thereof by a predetermined factor. In addition, the storage resource may be in a datastore including VSAN.

In yet another aspect, a method of migrating a host and/or a workload from the first HCI cluster to the second HCI cluster, different from the first HCI cluster includes (a) receiving a user specified template for a host configuration of hosts in the second HCI cluster, the template specifying a quantity of one or more computer resources (e.g., a processor, a memory, a storage resource, a network I/O resource and/or I/O pathways) provided by the hosts; (b) computing a demand on the computer resource(s) for performing the workload in the first HCI cluster; (c) based at least in part on the demand and the quantity of the computer resource(s) specified in the template, determining a number of hosts in the second HCI cluster required for satisfying the demand; and (d) dedicating the determined number of hosts in the second HCI cluster to execution of the demand.

The template may specify multiple quantities, each associated with one of the computer resources provided by the hosts in the second HCI cluster. In addition, the method may further include (d) for each of the computer resources, computing a corresponding demand for performing the workload in the first HCI cluster; and (e) based on the quantity specified with each of the computer resources and the corresponding demand on each of the computer resources for performing the workload, determining a corresponding number of hosts in the second HCI cluster for satisfying the corresponding demand on each of the computer resources. In one embodiment, the number of the hosts determined in step (c) is based on the greatest of the corresponding number of the hosts determined in step (e).

In various embodiments, the number of the hosts determined in step (c) is further based on a user policy setting. The user policy setting may include (i) a storage policy for a replication approach, (ii) a number of hosts in the second HCI cluster reserved for maintenance, (iii) a slack-space percentage and/or (iv) a compression or deduplication ratio. In addition, the number of the hosts determined in step (c) may be further based on a target utilization rate of the computer resource(s) in the second HCI cluster.

Additionally, the method may further include selecting the determined number of hosts in the first HCI cluster; and migrating the selected number of hosts from the first HCI cluster to the second HCI cluster. In one embodiment, the method further includes, thereafter, migrating the workload from the first HCI cluster to the second HCI cluster. In some embodiments, the method further includes determining a revenue and/or an expense associated with each host in the first HCI cluster; and selecting the number of the hosts to be migrated from the first HCI cluster to the second HCI cluster based at least in part on the associated revenues and/or expenses. In one implementation, the expenses of the selected number of the hosts to be migrated from the first HCI cluster to the second HCI cluster are larger than the revenues thereof by a predetermined factor.

Still another aspect of the invention relates to a computer system for migrating a host and/or a workload from the first HCI cluster to the second HCI cluster, different from the first HCI cluster. In various embodiments, the computer system includes a management system configured to (a) receive a user specified template for a host configuration of hosts in the second HCI cluster, the template specifying a quantity of one or more computer resources (e.g., a processor, a memory, a storage resource, a network I/O resource and/or I/O pathways) provided by the hosts; (b) compute a demand on the computer resource(s) for performing the workload in the first HCI cluster; (c) based at least in part on the demand and the quantity of the computer resource(s) specified in the template, determine a number of hosts in the second HCI cluster required for satisfying the demand; and (d) cause the determined number of hosts in the second HCI cluster to be dedicated to execution of the demand.

The template specifies multiple quantities, each associated with one of the computer resources provided by the hosts in the second HCI cluster. In addition, the management system may be further configured to (d) for each of the computer resources, compute a corresponding demand for performing the workload in the first HCI cluster; and (e) based on the quantity specified with each of the computer resources and the corresponding demand on each of the computer resources for performing the workload, determine a corresponding number of hosts in the second HCI cluster for satisfying the corresponding demand on each of the computer resources. In one embodiment, the number of the hosts determined in step (c) is based on the greatest of the corresponding number of the hosts determined in step (e).

In various embodiments, the number of the hosts determined in step (c) is further based on a user policy setting. The user policy setting may include (i) a storage policy for a replication approach, (ii) a number of hosts in the second HCI cluster reserved for maintenance, (iii) a slack-space percentage and/or (iv) a compression or deduplication ratio. In addition, the number of the hosts determined in step (c) may be further based on a target utilization rate of the at least one computer resource in the second HCI cluster.

Additionally, the management system may be further configured to select the determined number of hosts in the first HCI cluster; and migrate the selected number of hosts from the first HCI cluster to the second HCI cluster. In one embodiment, the management system is further configured to, thereafter, migrate the workload from the first HCI cluster to the second HCI cluster. In some embodiments, the management system is further configured to determine a revenue and/or an expense associated with each host in the first HCI cluster; and select the number of the hosts to be migrated from the first HCI cluster to the second HCI cluster based at least in part on the associated revenues and/or expenses. In one implementation, the expenses of the selected number of the hosts to be migrated from the first HCI cluster to the second HCI cluster are larger than the revenues thereof by a predetermined factor.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 2 depicts exemplary storage information received from a datastore in an HCI cluster in accordance with various embodiments of the current invention;

FIG. 3 depicts an exemplary user policy setting related to a replication approach in accordance with various embodiments of the current invention;

DETAILED DESCRIPTION

Figure 1:
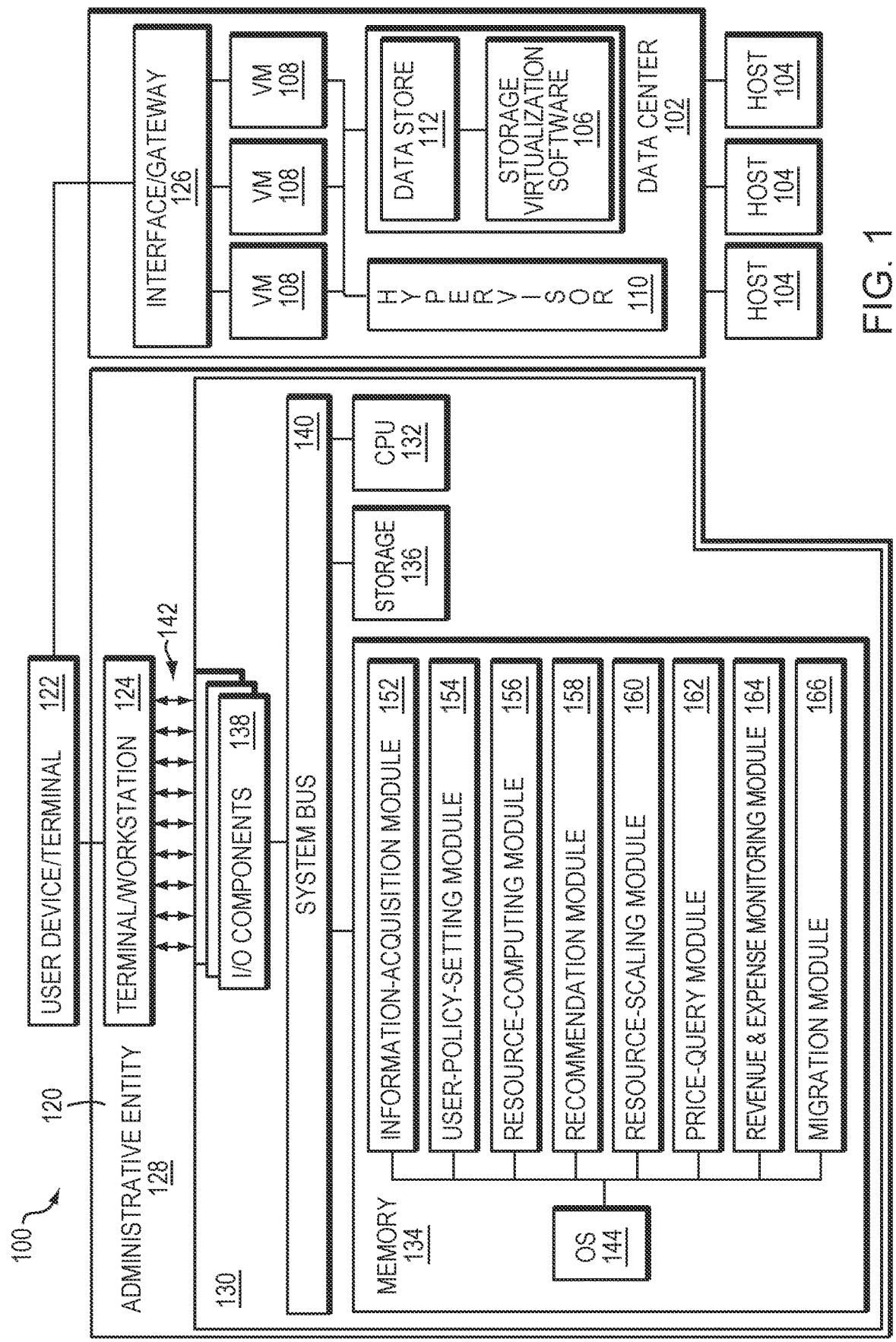
FIG. 1 schematically depicts an exemplary HCI cluster in accordance with various embodiments of the current invention.

FIG. 1 schematically shows an exemplary HCI cluster 100 including a datacenter 102 and one or more servers (or "hosts") 104 connected thereto for providing an HCI infrastructure platform that can support a cloud computing environment. Each host 104 may provide the datacenter 102 with one or more computational resources such as a processor, memory, network, storage, etc. for supporting operations of the datacenter 102 in the HCI cluster environment. For example, the datacenter 102 may include conventional storage virtualization software 106 for virtualizing the local physical storage resources of the hosts 104, turning them into one or more pools of storage that can be divided and assigned to virtual machines (VMs) 108 and applications according to their quality-of-service requirements. In addition, the datacenter 102 may include a hypervisor 110 integrated with the storage virtualization software 106 for creating and managing the VMs 108, performing computational virtualization, etc. In one embodiment, the datacenter 102 includes VMWARE, the storage virtualization software 106 includes or consists of VSAN, and the hypervisor 110 includes or consists of VSPHERE.

In various embodiments, the storage virtualization software 106 aggregates all local capacity devices into a single datastore 112 shared by all hosts 104 in the HCI cluster 100. The datastore 112 may be expanded (or scaled up) by adding capacity of devices or hosts with capacity to the HCI cluster 100. Preferably, all (or at least some) hosts 104 in the HCI cluster 100 share similar or identical resource configurations across all cluster members, including similar or identical storage configurations. Such a consistent configuration may balance VM storage components across all devices and hosts in the cluster 100. In one embodiment, hosts without any local devices may also participate and run their VMs on the datastore 112.

In various embodiments, users/developers can create a computing application (or workload) and then rely on a management system 120 to allocate appropriate computational resources to execute the application on the VMs 108 as further described below. The management system 120 is configured to enable users to use the hypervisor 110 to develop and deploy a computing application via user devices and/or terminals 122. The management system 120 may create, develop, troubleshoot, and/or upload the computing application to the HCI cluster 100 using, for example, a terminal and/or workstation 124 at the system side and an interface or gateway 126 designated as the frontend at the datacenter side. In a typical service management, the management system 120 is a customer of the datacenter 102, whereas the users represented by terminals 122 are customers of the management system 120.

The management system 120 may also include an automated administrative entity 128 for managing and supporting execution of the computing application. In one embodiment, the administrative entity 128 includes a networked computer 130 having a CPU 132, a memory 134 (which can be implemented as any type of volatile memory, such as SDRAM, or non-volatile, such as Flash memory), a storage device 136 (such as a magnetic, solid-state, or flash disk), and one or more input/output (I/O) components (e.g., a network I/O resource, I/O pathways, etc.) 138. The CPU 132 may be configurable to host one or more virtual machines and/or run various processes to manage and support execution of the computing application as further described below. In addition, the CPU 132 may provide the various computational functions described below through software, hardware, firmware, hardwiring, or any combination thereof. For example, the CPU 132 may include a general-purpose or special-purpose digital data processor programmed with software in a conventional manner. Memory 134 may temporarily store transitory information and allow the CPU 132 to quickly access the stored information. The storage device 136 may store more-permanent information in a non-volatile manner. For example, the storage device 136 may store a database of service-level agreements (SLAs) between the proprietor of the management system 120 and the users, a database including the user policy settings for storage in the datastore 112 (e.g., the storage policy for a replication approach, the number of hosts in the HCI cluster reserved for maintenance, the slack-space percentage, or the compression or deduplication ratio) as further described below, and a database including the revenue and/or expense associated with each host 104. Additionally or alternatively, the SLAs, the user policy settings for storage and/or the revenues and expenses of the hosts 104 may be stored in the datastore 112. The I/O components 138 may be connected to system interfaces. All of these elements in the computer 130 are interconnected using an internal bus 140. In addition, the computer 130 may include one or more external links 142 for connecting the computer 130 to elements in the HCI platform (e.g., the datacenter 102) and/or the user devices/terminals 122.

The memory 134 may include instructions for low-level operation of the computer 130, such as operating-system instructions, device-driver-interface instructions, or any other suitable instructions. The operating system is not limited to any particular type; rather, any operating system (such as WINDOWS, LINUX, or OSX) and/or other instructions are within the scope of the present invention. As further described below, the memory 134 may include an operating system 144 for directing the execution of low-level, basic system functions such as memory allocation, file management and operation of the main memory 134 and/or storage device 136. In addition, the memory 134 may include instructions, such as an information-acquisition module 152 for acquiring and/or receiving information (e.g., the raw capacity and raw free storage space in the datastore 112) from the datacenter 102 and/or accessing a database in the storage 136 or memory 134 to retrieve user policy settings for storage in the datastore 112, a user-policy-setting module 154 for allowing the user to provide the user policy settings, a resource-computing module 156 for computing the actual usable storage and actual free space of the storage in the datastore 112 based on the received storage information from the datacenter 102 and the retrieved user policy settings, a recommendation module 158 for recommending a number of hosts to be cloned and/or provisioned in order to expand the datastore 112 (e.g., when the storage is over-utilized) and/or suspended or terminated in order to contract the datastore 112 (e.g., when the storage is under-utilized), a resource-scaling module 160 for scaling up (e.g., by cloning or provisioning the hosts) or down (e.g., by suspending or terminating the hosts) the datastore 112 based on the recommendation provided by the recommendation module 158, a price-querying module 162 for querying the hosts to determine purchase prices for providing additional computational resources, a revenue and expense monitoring module 154 for determining the revenue and/or expense for each host 104 to allocate one or more computational resources to the HCI cluster 100, and a migration module 166 for migrating a workload and/or a host from a non-HCI cluster to the HCI cluster.

In operation, a computing application (or a workload) may be first deployed in the cloud-based HCI cluster 100 by the user and/or the management system 120 via the terminal 124 and/or interface 126; optionally, the application may be stored in the memory 134, storage device 136 and/or any memory/storage device accessible to the datacenter 102. In one embodiment, the application includes multiple application components for executing one or more computing functions on one or more of the VMs 108. An example of the application may be a NETFLIX transaction-processing application; one function of the transaction application may be a recommendation generator that gives the customer recommendations for additional movies. The management system 120 may delegate execution of the function(s) to one or more VMs 108 and/or manage the function execution in the cloud-based HCI cluster 100. Function execution may be triggered by, for example, a user request and/or other relevant events, such as changes to the pertinent data saved in memory 134.

In some embodiments, the information-acquisition module 152 acquires information about the storage in the datastore 112 from the datacenter 102. For example, referring to FIG. 2, VMWARE may provide raw information such as the raw capacity 202 and raw free space 204 associated with the VSAN datastore. But this information may not reflect the actual (or effective) usable storage space and actual (or effective) free space available to the user for utilization as, for example, the user policy settings (e.g., the storage policy for the replication approach, the compression ratio on the remaining storage, etc.) are not taken into account. As a result, the actual free space remaining in the storage may be significantly less than the amount provided by VMWARE. This may cause the user to over-utilize the storage in the datastore 112, thereby significantly increasing the latency when executing the application.

In various embodiments, the information-acquisition module 152 in the management system 120 can access a database (not shown) in the storage device 136 and/or datastore 112 to retrieve the user policy settings for storage in the datastore 112. In one implementation, the user policy settings include a default storage policy directed to replication; different replication approaches use different amounts of raw storage to produce the usable storage. For example, with reference to FIG. 3, the replication approach may include a redundant array of independent disks (RAID) such that the storage virtualization software 106 implements software-distributed RAID, which leverages the disks in the datastore 112. In addition, the replication approach may allow the user to set a desired protection level by including a number of failures to tolerate (FTT). For example, the user may set RAID=1 and FTT=1; this indicates a replication factor of 2, and the storage virtualization software 106 may therefore create two copies of everything on two different hosts 104 in the HCI cluster 100 in order to tolerate a single failure (such as a single solid-state drive (SSD) failure, a single hard-disk-drive (HDD) failure or a single host failure) to maintain access to the data in the datastore 112. Thus, to compute the actual usable storage in the datastore 112, the management system 120 may divide the raw free space provided by the datacenter 102 by the replication factor.

Additionally or alternatively, the user policy settings may include one or more HCI storage policies. For example, the HCI storage policies may include a slack space percentage (SSP) that indicates the free space set aside to allow the hypervisor 110 to move objects (e.g., files) around the cluster 100 in order to balance the resource usage across all the hosts 104. As a result, the raw free space information provided by the datacenter 102 has to be reduced based on the setting of the slack space percentage in order to accurately compute the actual useable storage. Typically, the slack space percentage is set between 20% and 30%, but it may be higher or lower, depending on the user's needs.

Further, the host 104 may periodically (or at least occasionally) need to be taken out of service for maintenance. Before the host goes into maintenance mode, the hypervisor 110 may evacuate the data therefrom and move it to another host(s) in the cluster 100 in order to maintain the integrity of the replication required by the storage policy. Thus, the HCI storage policies may include a number of hosts in the HCI cluster 100 reserved for the purposes of maintenance (or "host capacity reservation" (HCR)). As a result, the storage capacity of the reserved host(s) may be subtracted from the raw free space provided by the datacenter 102 to determine the actual useable storage. Typically, a storage reservation of one or two host's capacity is sufficient for maintenance.

In some embodiments, the datacenter 102 supports deduplication and/or compression of the objects. If the user elects to enable this function and includes, for example, an expected compression ratio in the user policy settings, the management system 120 may increase the actual useable storage based on the compression ratio. Additionally or alternatively, the expected compression ratio can be predicted by some other means such as by retrieving the current compression ratio from the datastore 112. For example, a compression ratio of two can double the amount of usable storage volume in the datastore 112.

In some embodiments, the user has not set up the policies for storage in the datastore 112 yet, and thus the information-acquisition module 152 cannot find the user policy settings in the database. In one embodiment, upon the information-acquisition module 152 determining that no user policy settings associated with the user are found, the user-policy-setting module 154 may urge the user to provide the settings, and upon receiving the user's settings, store them in the database in the storage device 136 and/or datastore 112.

After retrieval or receipt of the user policy settings for storage in the datastore 112, the resource-computing module 156 in the management system 120 may compute the actual usable storage based thereon:

$$\text{actual } usuable \text{ storage} = \\ \frac{\text{raw capacity} - HCR \times \text{raw space contributed by the largest host}}{\text{replication factor}} \times \\ (1 - SSP) \times \text{compression ratio} \qquad \text{Eq. (1)}$$

where raw capacity is the information provided by the datacenter 102, HCR represents the host capacity reservation, and SSP represents the slack space percentage. In addition, the used amount of the actual useable storage can be computed as:

$$\text{used storage} = \frac{\text{raw capacity} - \text{raw free space}}{\text{replication factor}} \times \text{compression ratio} \qquad \text{Eq. (2)}$$

where raw free space is, again, the information provided by the datacenter 102. Based on Eqs. (1) and (2), the management system 120 may then compute an effective utilization rate of the storage:

$$\text{effective utilization rate} = \frac{\text{used storage}}{\text{actual } usuable \text{ storage}} \qquad \text{Eq. (3)}$$

For example, assuming that the datacenter 102 reports the datastore 112 associated therewith having 10 hosts, each contributing 10 terabytes (TB) of raw capacity, and 45 TB of free space, and the user policy settings for storage includes RAID=1, FTT=1, a slack space percentage of 25%, a host capacity reservation of 2, and a compression ratio of 2, the resource-computing module 156 may compute the actual usable storage as:

$$\frac{10 \times 10 - 2 \times 10}{2} \times (1 - 25\%) \times 2 = 60 \text{ TB},$$

and the used amount of the actual usable storage as:

$$\frac{10 \times 10 - 45}{2} \times 2 = 55 \text{ TB using Eqs. (1) and (2), respectively.}$$

As a result, the actual free storage space is only 5 TB (as opposed to the 45 TB provided by the datacenter 102). This may mislead the user—while the user thinks that only 65% of the available storage has been used based on the information provided by the datacenter 102, in actuality, 91.6% of the usable storage has already been utilized. If the user sets a target storage utilization rate of 85%, the storage will be over-utilized and may cause an unexpected exhaustion of storage resources thereby disrupting the application or causing unacceptably long latency when executing the user's application due to an imbalance of resources used by the datastore 112 across hosts 104.

In various embodiments, upon determining that the storage is over-utilized (e.g., the actual utilization rate is larger than the target utilization rate), the recommendation module 158 in the management system 120 may recommend an action to scale up the storage by purchasing additional storage. For example, the resource-scaling module 160 in the management system 120 may clone one or more of the existing host(s) 104 in the HCI cluster 100 and/or provision a number of the new host(s) to provide the required additional storage capacity. In the above-described example, to reduce the actual storage utilization rate from 91.6% to the target rate of 85%, the recommendation module 158 may determine that cloning or provisioning one host having 10 TB of raw capacity is sufficient to provide the additional 7.5 TB of the actual usable storage for relieving the over-utilization of the storage.

Once the number of the hosts to be cloned/provisioned is determined, the price-querying module 162 in the management system 120 may query the hosts (at least some of them) in the cluster 100 (or, in some embodiments, outside the cluster 100) to provide the additional storage to the datastore 112 to execute the computing function/application. In some embodiments, each of the hosts offers a purchase price; based thereon, the recommendation module 158 may select the host(s) offering the lowest price. Subsequently, the resource-scaling module 160 may automatically clone or provision the selected host(s) to provide the additional storage in the datastore 112.

The datastore 112 may supply multiple commodities (or resources) related to, for example, various input/output operations per second (IOPS), latencies, and/or provisioned storage. For example, the datastore 112 may provide an IOPS capacity (or storage access), which can be estimated by multiplying an estimate of the effective IOPS capacity per host by the number of hosts in the HCI cluster 100. In one embodiment, the management system 120 retrieves the estimated effective IOPS capacity from the HCI storage policies set by the user. In addition, when considering adding host(s) 104 to expand the datastore 112 and thereby reduce the actual storage utilization rate, the recommendation module 158 may optimize the number of the hosts to be added based on the demands on all commodities. For example, assuming that the user sets an overprovisioning ratio of 2 in the above-described example and the total provisioned size of the VMs on the datastore is 180 TB, the recommendation module 158 can recognize that there is a shortage of at least 60 TB in the storage provisioned capacity. Thus, at least four additional hosts are needed to resolve the shortage (since each host provides 7.5×2=15 TB of the usable storage provisioned capacity). In one implementation, the management system 120 then recommends and/or purchases the storage provisioned capacity from four hosts (even though one host is already sufficient to reduce the actual storage utilization rate from 91.6% to the target rate of 85%) in order to satisfy both the target utilization rate and the usable storage provisioned capacity.

This approach may also be used to determine the number of hosts to be cloned or provisioned when expanding the cluster 100 to provide additional types of computational sources such as a CPU, memory, network I/O resource, I/O pathways, etc. For example, when executing a computing function/application, both the storage and memory may be over-utilized; and while cloning one host is sufficient to reduce the effective storage utilization rate below the target utilization rate, cloning two hosts may be necessary to reduce the memory utilization rate below its corresponding target utilization rate. In this case, the resource-scaling module 160 may clone two hosts in order, again, to satisfy the target utilization rates of both the memory and storage.

In some embodiments, the storage in the datastore 112 is under-utilized (e.g., the actual utilization rate is much smaller (e.g., five times or ten times) than the target utilization rate), and the resource-scaling module 160 may scale down the storage capacity in the datastore 112 by suspending or terminating one or more hosts 104 in the cluster 100. Suspension/termination of the host(s), however, may also reduce the capacities of other computational resources (e.g., memory and CPU) provided by the suspended/terminated host(s). Thus, in one embodiment, the resource-scaling module 160 suspends/terminates the host(s) 104 only when all other computational resources (or at least one of them) provided by the host(s) 104 are also under-utilized. For example, when a large percentage (e.g., 90%) of the memory is used in the cluster 100, the resource-scaling module 160 may not suspend/terminate the host(s) 104 even though the storage is under-utilized. Accordingly, when determining whether to scale up or down a specific computational resource based on its usage in the cluster 100, the management system 120 may consider the usage of all (or at least some) other computational resources provided by the hosts 104 in the cluster 100 to optimize the overall performance in executing the user's computing functions/applications.

In various embodiments, the management system 120 (e.g., the revenue and expense monitoring module 164) maintains a full accounting of the revenues and costs of allocating storage (and/or other computational resource(s)) from each host 104 to the cluster 100, monitors these accounts and provides notifications upon the occurrence of certain accounting events. The revenue and expense monitoring module 164, by itself or with the assistance of an incorporated or separate return-on-investment (ROI) module (not shown), enables the hosts to monitor the ROI of the storage (or other computational resource(s)). The ROI is defined as revenue divided by cost, where revenue is the income from real and/or virtual payments collected by the hosts 104 from the user and/or datacenter 102. Cost may be assigned in any suitable fashion; for example, the cost may be the out-of-pocket expense of using an external resource, or the fully loaded, attributed internal cost of using an on-premises resource. The cost may be measured in real currency (for out-of-pocket expenses) or virtual currency (for attributed internal costs). The revenue and expense monitoring module 164 may compute the revenue from storage based on a unit price thereof and the amount of storage space contributed by each host 104 to the datastore 112 for executing a computing function/application. Similarly, the cost may include the amounts actually paid by the host 104 for providing the storage space required for executing the computing function/application as well as the attributed cost including overhead of support by on on-premises equipment. The revenue and/or expense may be computed over a predetermined period of time (e.g., ten hours, ten days, one month, etc.). Further details concerning approaches to determining and monitoring resource revenue and/or expense are provided, for example, in U.S. Pat. No. 10,346,775, the entire disclosure of which is hereby incorporated herein by reference.

In various embodiments, based on the monitored revenue and/or expense, the management system 120 (e.g., the resource-scaling module 160) may determine whether and/or which host(s) to clone/provision in order to scale up the storage (or other computational resource(s)) and/or to suspend/terminate in order to scale down the storage (or other computational resource(s)) in the cluster 100. For example, when the resource-computing module 156 determines that additional storage is required to optimize performance in executing an application, the revenue and expense monitoring module 164 may identify one or more hosts whose revenues (real and/or attributable) are larger than the expenses (also real and/or attributable) by a predetermined factor (e.g., twice, five times or ten times). Based thereon, the resource-scaling module 160 may then clone the identified host(s) to provide the required additional storage to the datastore 112. Conversely, when the revenue and expense monitoring module 164 determines that the expense for a host is larger than the revenue by the predetermined factor, the resource-scaling module 160 may suspend/terminate this host and reduce the storage capacity of the datastore 112 in the HCI cluster 100.

In various embodiments, the decision whether to clone/provision or suspend/terminate a host 104 depends on the revenue and expense associated with the host only and may be independent of the actual utilization rate(s) of the computational resource(s) (e.g., the storage, CPU, memory, etc.) in the datacenter 102. For example, if the revenue and expense monitoring module 164 determines that the revenue for a host is larger than the expense by the predetermined factor, the resource-scaling module 160 may clone the host to provide additional computational resources to the datacenter 102 even though these resources are not yet over-utilized. In one embodiment, if the revenue and expense monitoring module 164 determines that it is inexpensive (e.g., having an ROI of 5) to operate a particular datacenter, the resource-scaling module 160 may add one or more hosts to support the datacenter (since the expenses are small). This may afford the opportunity to overprovision as well as avoid the occurrence of over-utilization of the computational resources. Similarly, when the revenue and expense monitoring module 164 determines that the datacenter is too expensive to operate (e.g., having an ROI of 0.5), the resource-scaling module 160 may not add additional hosts to expand the datacenter 102 even if the performance for executing a computing function/application is currently unsatisfactory (e.g., the storage is over-utilized already and thereby causing a long latency).

In one embodiment, the resource-scaling module 160 can proactively clone/provision one or more hosts to provide additional computational resources (e.g., storage) to the datacenter 102 even though the revenues and expenses associated therewith are acceptable and there is no reason to expand with the existing workload. In this way, the hosts 104 may receive some profits when a new workload is introduced to be executed on a new VM in the datacenter later.

In some embodiments, the management system 120 delegates execution of the computing functions/applications to one or more containers in the cloud-based HCI cluster 100. In contrast to VMs, which provide virtualization at the physical hardware level (e.g., by virtualizing the entire server hardware stack), containers provide virtualization at the operating-system (OS) level in which the kernel of an OS can support multiple isolated user-space instances. Stated another way, a container is based on server virtualization that uses a shared operating system. Rather than virtualizing hardware and creating entire virtual machines, each with its own operating system, containers run atop the shared operating system kernel and file system. Like shipping containers for cargo, these software containers can ship applications (and their associated functions) across different network-based systems (e.g., cloud computing based systems) and limit the impact of one container's activities on another container.

A container system may include software abstractions to virtualize computer resources (or computational resources), which are used by applications running in the container ("containerized" applications). The container system facilitates provisioning of containers, allocation and control of the resources available to a container, deployment and execution of applications in the container, and full use of the container resources by such containerized applications while isolating them from other applications and sharing the underlying resources. When a containerized application accesses a virtualized container resource (e.g., CPU, memory, storage I/O, Network I/O), the container system maps this to a direct access of the underlying physical resource.

Figure 4:
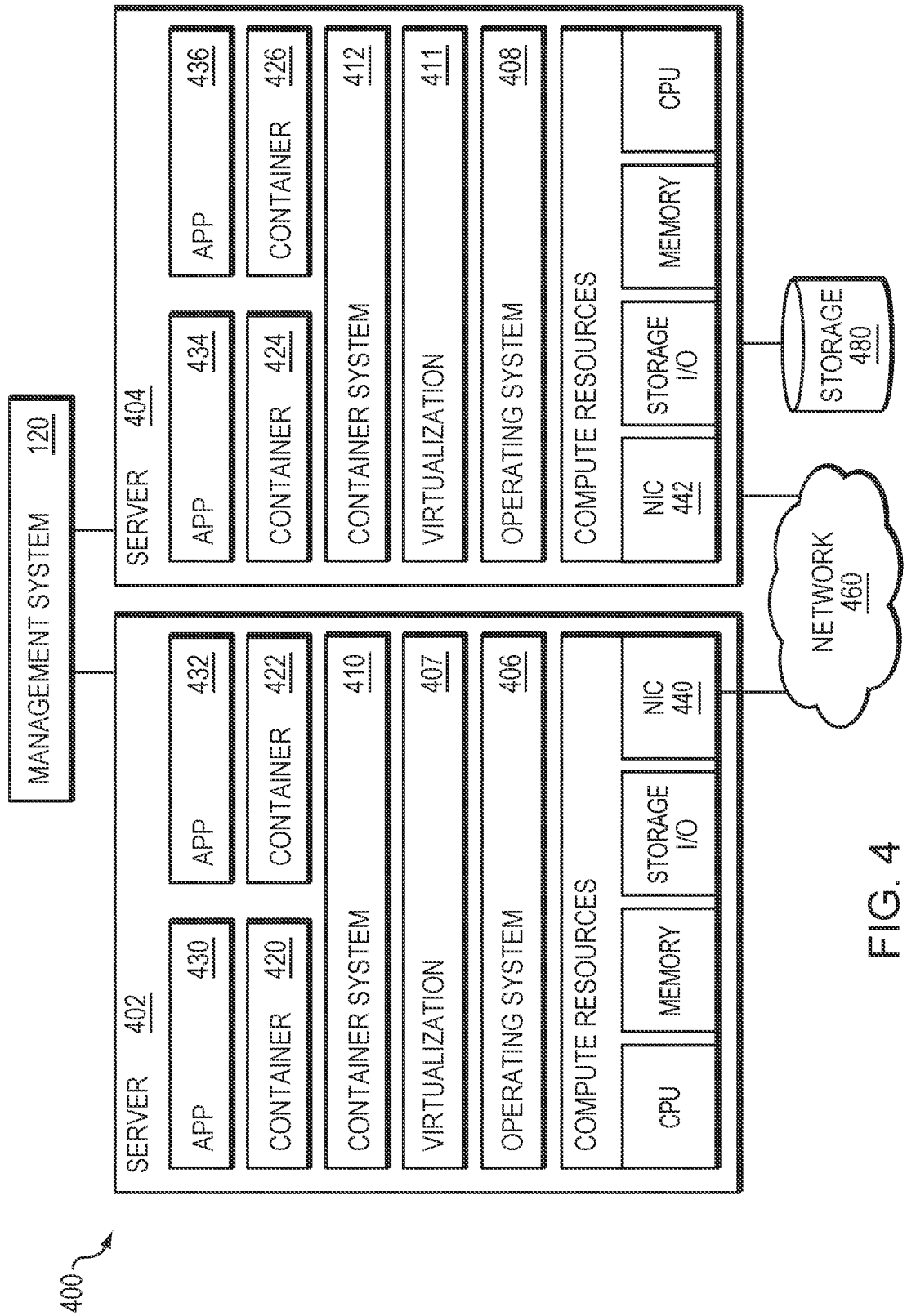
FIG. 4 is a block diagram of an example container environment in accordance with various embodiments of the current invention.

FIG. 4 illustrates a representative container system 400 in accordance with various embodiments. The system 400 includes two servers 402, 404 that run respective container systems 410, 412. The container system 410, at the server 402, allocates computer resources (or compute resources) of the server 402—e.g., CPUs, memories, storage volume, storage, and/or network I/O pathways and bandwidth—to two containers 420, 422. Similarly, the container system 412 at the server 404 allocates resources of the server 404 to containers 424, 426. The containers 420, 422, 424, 426 execute respective containerized applications 430, 432, 434, 436.

As previously discussed, container systems support flexible organization. In the example system 400, the servers 402, 404 may be physical machines with physical computer (or computational) resources. Alternatively, the server 402 may be a virtual machine with virtualized resources while the server 404 is a physical server. The containers 420, 422, 424, 426 may be distinct containers, or replicated copies of a single container. In some embodiments, a group of containers may be clustered into a container-Point-of-Delivery (cPOD) system, to run related applications. The I/O pathway between the applications 430, 434 traverses the application 430, the container 420, the container system 410, an operating system 406, a network interface card (NIC) 440, a data network 460, a NIC 442, an operating system 408, the container system 412, the container 424, and the application 434. Further details of the container system and approaches for managing resources therein are provided, for example, in the '775 patent mentioned above.

The containers 430-436 may be located in the same or different HCI clusters and the computing function in the application 406 can be executed by any of the containers 430-436. The management system 120 may determine, for example, the effective usable storage, used storage, effective free storage space and/or effective utilization rate associated with the storage in the datacenter 102 and, based thereon, scale up or down the storage as described above. Again, the management system 120 (e.g., the recommendation module 158) may consider the usage of all (or at least some) computational resources contributed by the hosts 104 to the datacenter 102 when determining whether and how much additional resources (and thereby additional hosts) are necessary to expand the HCI cluster so as to optimize performance (e.g., in executing a computing function/application). In some embodiments, the management system 120 determines whether to expand or contract the HCI cluster (by, for example, cloning/provisioning or suspending/terminating the host(s)) based on the revenue and/or expense associated with each host 104 as described above.

Figure 5A:
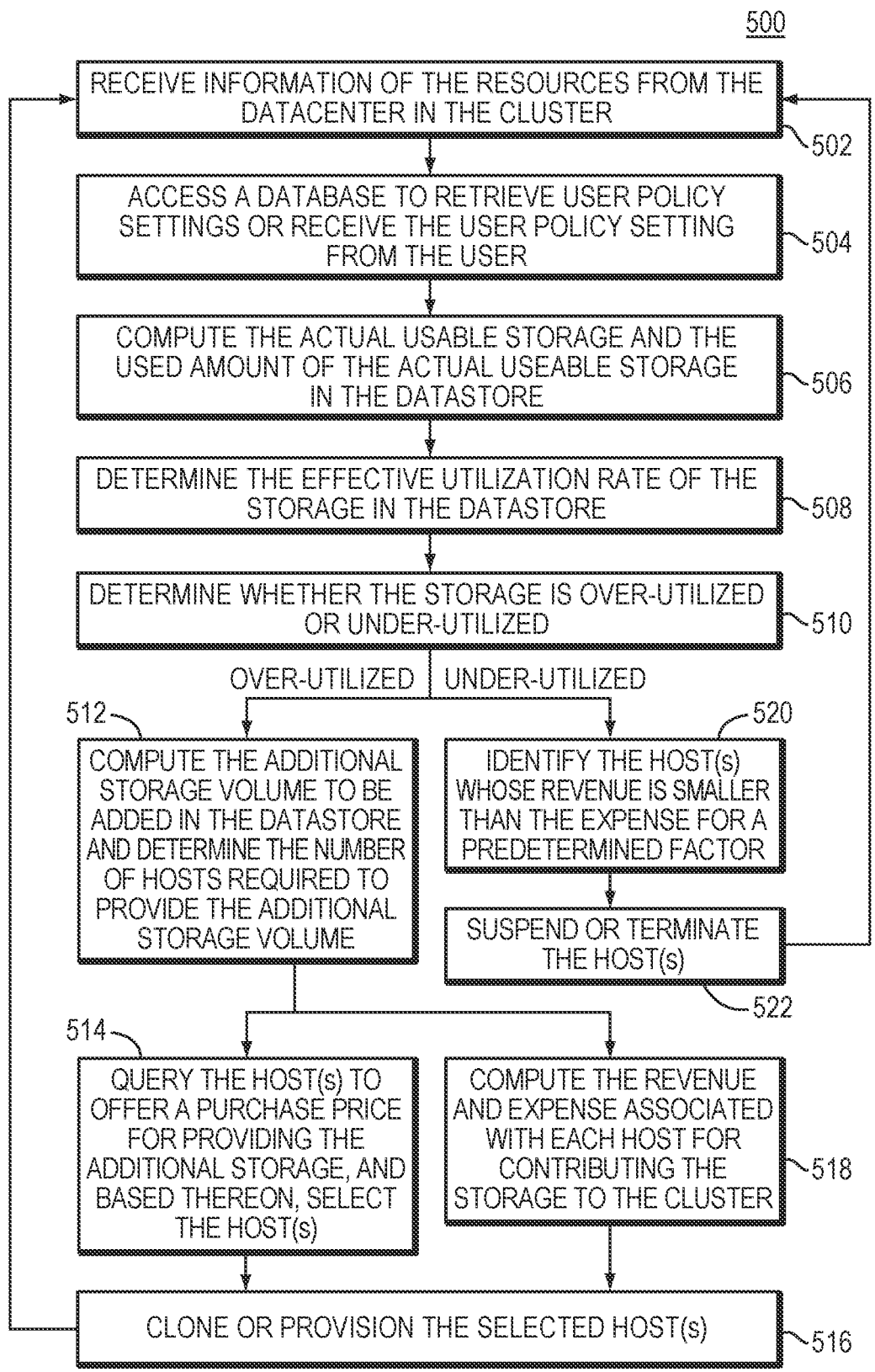
FIG. 5A is a flow chart illustrating an approach for computing an effective useable storage and an effective free storage space in an HCI cluster and based thereon scaling up or down the storage in accordance with various embodiments of the present invention.

FIG. 5A is a flow chart illustrating an exemplary approach 500 for computing an effective useable storage and an effective free storage space in an HCI cluster and based thereon scaling up or down the storage in the cluster. In a first step 502, the management system 120 (e.g., the information-acquisition module 152) receives raw information such as raw storage capacity and/or raw free storage space from the datacenter in the cluster. In a second step 504, the management system 120 (e.g., the information-acquisition module 152) retrieves from a database (in the storage device 136 and/or datastore 112) the user policy settings for storage in the datastore 112. The user policy settings may include, for example, a default storage policy related to replication and HCI storage policies that include the slack space percentage, host capacity reservation, deduplication and/or compression ratio, etc. If the user policy settings are not found in the database, the management system 120 (e.g., the user-policy setting module 154) may urge the user to enter the policy settings. In a third step 506, based on the storage information acquired in step 502 and the user policy settings retrieved/received in step 504, the management system 120 (e.g., resource-computing module 156) computes the actual usable storage and the used amount of the actual useable storage in the datastore 112 using Eqs. (1) and (2). In a fourth step 508, the management system 120 (e.g., resource-computing module 156) determines the effective free storage space and effective utilization rate of the storage in the datastore 112. Based thereon, the management system 120 (e.g., the recommendation module 158) determines whether the storage in the datastore is over-utilized (e.g., when the effective utilization rate is above a predetermined threshold (e.g., 80%)) or under-utilized (e.g., when the effective utilization rate is below a predetermined threshold (e.g., 50%)) (in a fifth step 510). If the storage is over-utilized, the management system 120 (e.g., the recommendation module 158) computes the additional storage volume to be added in the datastore 112 to relieve the over-utilized situation and, based thereon, determines the number of hosts required to provide the determined additional storage volume (in step 512). The management system 120 (e.g., the price-querying module 162) may then query the existing host(s) in the HCI cluster 100 and/or new hosts outside the HCI cluster 100 to offer a purchase price for providing the additional storage and select the host(s) offering the lowest price (in step 514). Subsequently, the management system 120 (e.g., the resource-scaling module 160) may automatically clone the selected existing host(s) in the HCI cluster 100 and/or provision the selected new host(s) outside the HCI cluster 100 to provide the additional storage volume, thereby scaling up the storage in the cluster (in step 516). Alternatively, in some embodiments, the management system 120 (e.g., the revenue and expense monitoring module 164) computes the revenue and expense associated with each host 104 for contributing the storage to the datastore 112 in the HCI cluster 100 and, based thereon, identifies the host(s) whose revenue is larger than the expense by a predetermined factor (e.g., twice, five times or ten times) (in step 518). Again, the management system 120 (e.g., the resource-scaling module 160) may then automatically clone or provision the identified host(s) to provide the additional storage (in step 516). If, however, the storage is under-utilized, the management system 120 may identify the host(s) whose expense is larger than the revenue by the predetermined factor (in step 520), and suspend or terminate the host(s) 140 to scale down the storage in the HCI cluster. Steps 502-522 may be performed periodically and/or upon occurrence of an external event. For example, the user may change the computing function/application at any arbitrary time, which may result in a change in the storage utilization. As a result, steps 502-522 may be performed every time when a change in the storage occurs so as to scale up or down the storage in the HCI cluster. Additionally or alternatively, steps 502-522 may be periodically performed (i.e., on a scheduled basis independent of the storage change); this way the storage utilization in the HCI cluster may be periodically updated, and based thereon, the management system 120 may periodically scale up/down the storage.

Figure 5B:
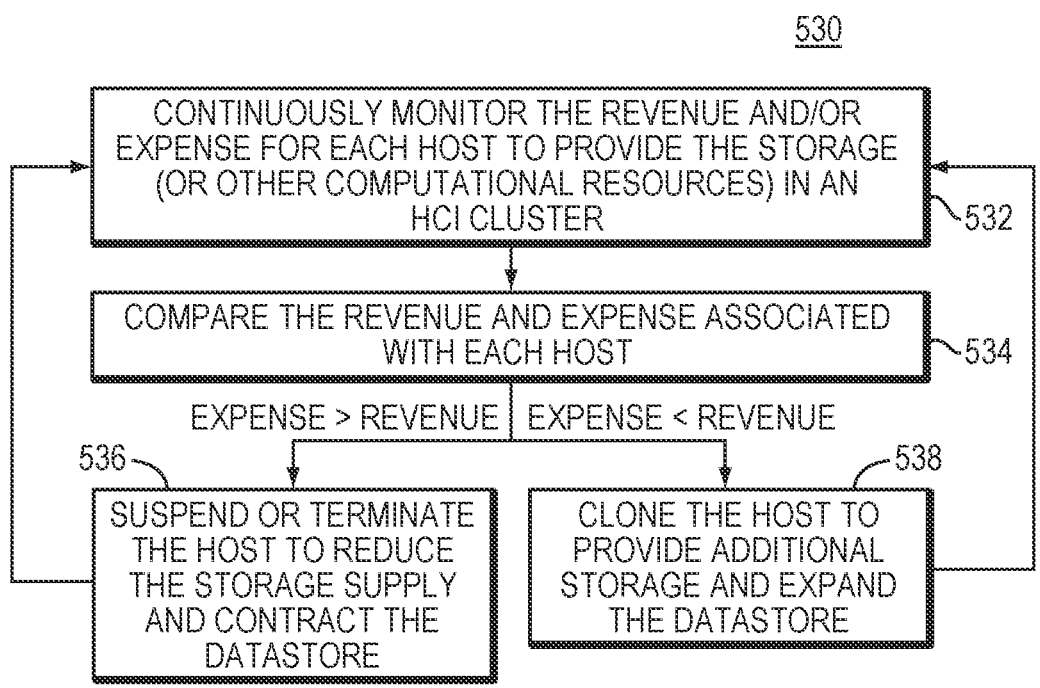
FIGS. 5B and 5C are flow charts illustrating exemplary approaches for scaling up or down the storage in an HCI cluster in accordance with various embodiments of the current invention.
Figure 5C:
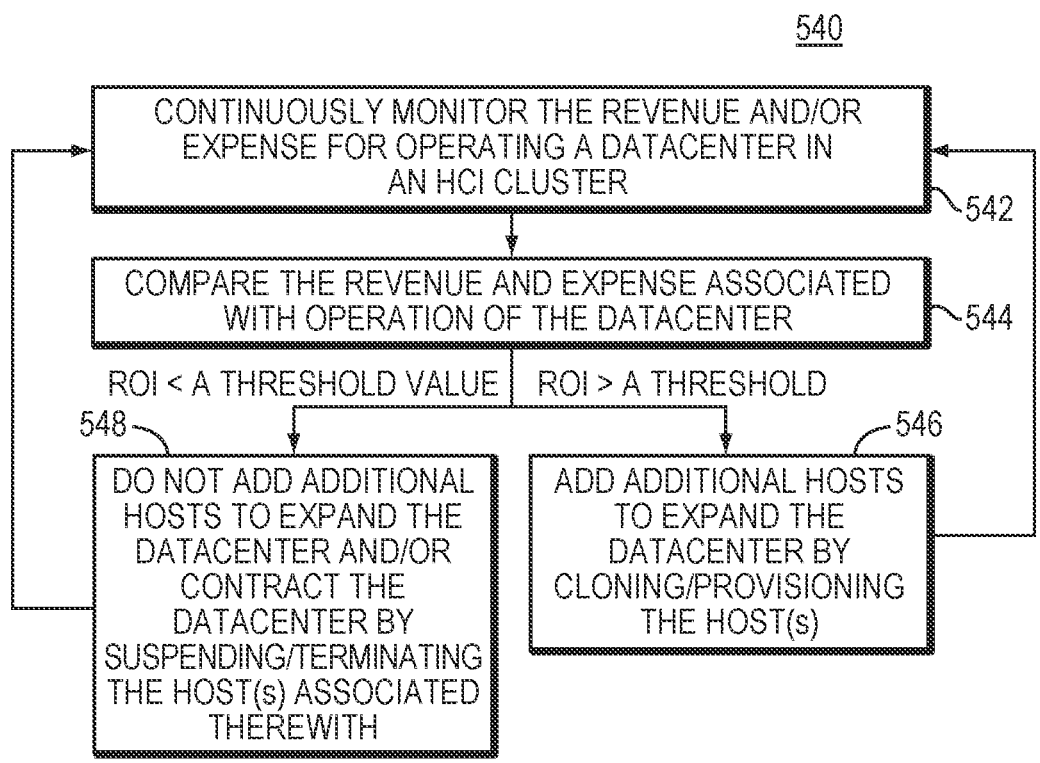

FIGS. 5B and 5C are flow charts illustrating exemplary approaches 530, 540 for scaling up or down the storage (or other computational resources) in an HCI cluster. In a first step 532, the management system 120 (e.g., the revenue and expense monitoring module 164) continuously monitors the revenue and/or expense for each host providing the storage (or other computational resources) in the cluster. In a second step 534, the management system 120 (e.g., the revenue and expense monitoring module 164) compares the revenue and expense associated with each host. If the expense for a host is larger than the revenue by a predetermined factor (e.g., twice, five times or ten times), the management system 120 (e.g., the resource-scaling module 160) suspends or terminates the host to reduce the storage (or other computational resource) supply, thereby contracting the datastore (in a step 536). Conversely, if the revenue for a host is larger than the expense by the predetermined factor, the management system 120 clones the host to provide additional storage (or other computational resource), thereby expanding the datastore (in a step 538). Again, steps 532-538 may be performed periodically and/or upon occurrence of an external event (e.g., when the user changes the computing function/application) so as to periodically and/or timely scale up/down the storage (or other computational resources). In one embodiment, the decision to clone the host is independent of the effective utilization rate of the storage. In addition, the management system 120 may continuously compute and/or monitor the revenue and/or expense for operating the datacenter (step 542). The management system 120 then compares the revenue and expense associated with operation of the datacenter (step 544). If the management system 120 determines that it is inexpensive (e.g., having the ROI of 5) to operate the datacenter, it may add one or more hosts to support the datacenter since the expenses are small (step 546). Conversely, the management system 120 (e.g., the revenue and expense monitoring module 164) may determine that the datacenter is expensive to operate (e.g., having the ROI of 0.5); in such a situation, the management system 120 (e.g., the resource-scaling module 160) may not add additional hosts to expand the datacenter even if the performance for executing a computing function/application is unsatisfactory (e.g., the storage is over-utilized, thereby causing a long latency) (in a step 548). Additionally or alternatively, the management system 120 may suspend or terminate the host(s) to contract the datacenter when the expense of operating the datacenter is too high (e.g., ROI>0.5). Optionally, steps 542-548 may be performed periodically and/or upon occurrence of an external event so as to periodically and/or timely expand or contract the datacenter.

In various embodiments, the user can add an additional workload into the HCI cluster 100 for execution. The newly added workload may require additional storage space and/or other computational resources (CPU, memory, network I/O resource, I/O pathways, etc.) for execution. Therefore, the management system 120 (e.g., the resource-scaling module 160) may clone one or more existing hosts and/or provision one or more new hosts to expand the datacenter 102, thereby providing the required additional computational resources. To determine the number of hosts for expanding the datacenter 102, the management system 120 (e.g., the recommendation module 158) may, again, consider the required amounts of all (or at least some) of the computational resources. For example, assuming execution of the additional workload requires at least an additional 100 GB of the memory and 10 TB of the storage space, and the current demands on both memory and storage in the HCI cluster are high (e.g., more than 80%), the management system 120 (e.g., the resource-computing module 156 and recommendation module 158) may determine the number of hosts to be cloned/provisioned so as to satisfy both the direct demand of 100 GB memory on the host(s) and the indirect demand of 10 TB storage on the host(s) via the datastore (e.g., VSAN).

Assuming each host supplies 100 GB of memory and 10 TB of raw storage capacity, the direct demand of the memory requires one additional host to be added in the cluster 100, while the indirect demand of the storage requires two hosts (since each host supplies an effective usable storage of 7.5 TB as described above using Eq. (1)) to be added in the cluster 100. In one embodiment, the management system 120 (e.g., the recommendation module 158) may then determine that it is necessary to clone/provision two hosts in order to satisfy both demands on the memory and storage; this causes the memory and the storage to expand by 200 GB and 15 TB, respectively, in the HCI cluster 100. Similarly, if each host can supply 25 GB of memory and 10 TB of raw storage capacity, four hosts are necessary to satisfy the direct demand on the memory and, again, two hosts are sufficient to satisfy the indirect demand on the storage. In this situation, the management system 120 (e.g., the recommendation module 158) may determine that it is necessary to clone/provision four hosts in the cluster in order to, again, satisfy both demands on the memory and storage.

As described above, the management system 120 (e.g., the price-querying module 162) may query the hosts in the cluster 100 (or, in some embodiments, outside the cluster) to provide the required additional computational resources (or at least a portion thereof) for executing the additional workload. Each of the hosts may offer a purchase price, and the recommendation module 158) may, based thereon, select the host(s) offering the lowest price and subsequently cause the resource-scaling module 160 to automatically clone/provision the selected hosts to provide the required resources.

In some embodiments, the management system 120 identifies the host(s) to be cloned/provisioned based on the revenue(s) and expenses(s) associated therewith for providing the additional computational resources for executing the additional workload. As described above, the management system 120 (e.g., the revenue and expense monitoring module 164) may monitor full accounting of the revenue and cost for each of the hosts. Thus, upon determining that the revenue for a host is larger than the expense by a predetermined factor (e.g., twice, five times or ten times), the management system 120 may automatically clone/provision the host to provide the additional resources for executing the additional workload in the HCI cluster 100.

Figure 6:
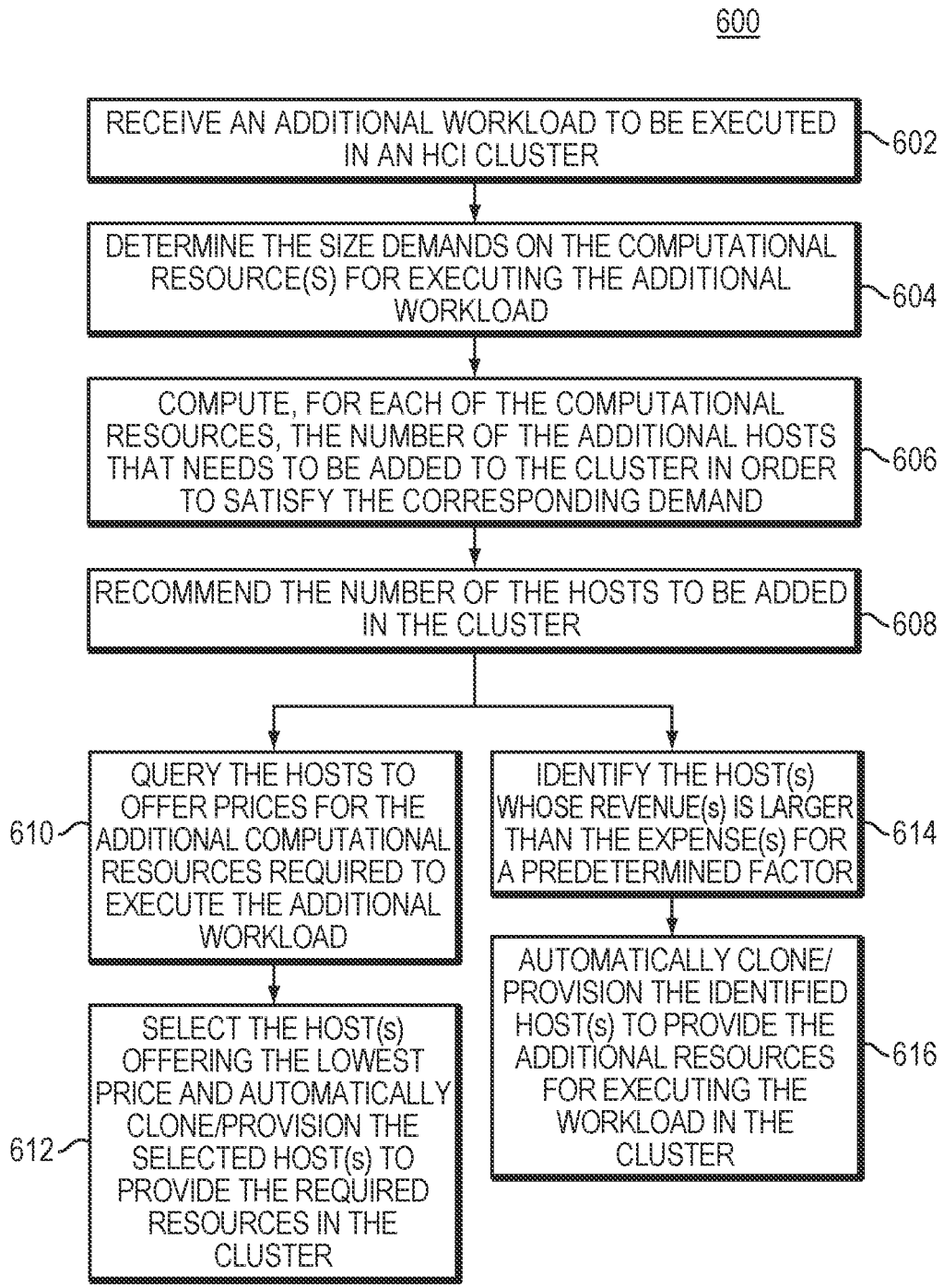
FIG. 6 is a flow chart illustrating an approach for expanding an HCI cluster so as to execute an additional workload therein in accordance with various embodiments of the present invention.

FIG. 6 is a flow chart illustrating an exemplary approach 600 for expanding an HCI cluster so as to execute an additional workload therein. In a first step 602, the management system receives the additional workload to be executed from the user. In a second step 604, the management system 120 determines the size demand on each computational resource for executing the additional workload in the HCI cluster. In some embodiments, the demand includes a direct demand on the host(s) for directly providing the computational resources (e.g., memory) to execute the workload and an indirect demand on the host(s) for indirectly providing the computational resource (e.g., storage) via the datastore 112 to execute the additional workload in the HCI cluster. Based thereon, the management system 120 (e.g., the resource-computing module 156) computes, for each of the computational resources, the number of the additional hosts that need to be added to the HCI cluster in order to satisfy the corresponding demand (in a step 606). In one implementation, the management system 120 (e.g., the recommendation module 158) recommends the number of hosts to be added in the HCI cluster to satisfy both the direct and indirect demands on the computational resources (in a step 608). In one embodiment, the recommended number of hosts to be added in the cluster is the greater of the number of additional hosts determined in steps 606 for satisfying the direct and indirect demands on the computational resources. To determine which host(s) are to be added to expand the cluster for executing the additional workload, the management system 120 (e.g., the price-querying module 162) may query the hosts in the cluster 100 (or, in some embodiments, outside the cluster) to offer purchase prices for the additional computational resources (or at least a portion thereof) (in a step 610). Based on the prices, the management system 120 may select the host(s) offering the lowest price and automatically clone/provision the selected host(s) to provide the required resources (in a step 612). Alternatively, the management system 120 may identify the host(s) based on the revenue(s) and expenses(s) associated therewith. For example, the management system 120 may identify the host(s) whose revenue(s) are larger than the expense(s) by a predetermined factor (e.g., twice, five times or ten times) (in a step 614), and then automatically clone/provision the identified host(s) to provide the additional resources for executing the additional workload in the cluster 100 (in a step 616).

The management system 120 may enable the user to migrate a workload and/or a host from a non-HCI cluster to an HCI cluster. In one embodiment, upon receiving the user's request for a workload/host migration, the management system 120 (e.g., the information-acquisition module 152) may access the storage device 136 to retrieve a user-specified template for a host configuration of the hosts in the HCI cluster; the template may specify the quantity (e.g., the capacity) of each of the computational resources (e.g., CPU, memory, raw storage amount, IOPS, etc.) provided by the hosts. If the user-specified template is not yet stored in the database, the management system 120 may request the user to provide the template. In addition, the management system 120 (e.g., the resource-computing module 156) may compute the demand on each of the computational resources in executing the workload currently in the non-HCI cluster. Based on the computed demands on the resources and the quantities of the resources specified in the template, the management system 120 (i.e., the recommendation module 158) may determine the number of hosts in the HCI cluster required to satisfy the demands and execute the workload. For example, assuming the template specifies that each host supports 100 GB of memory and 10 TB of storage, the demands on the memory and storage to execute the workload in the non-HCI cluster are 1 TB and 100 TB, respectively, and the target utilization rates for both resources are 90%, the management system 120 can, based thereon, compute that eleven hosts in the HCI cluster may be sufficient to satisfy the demand and the target utilization rate for the memory. But because eleven hosts can in total contribute only 67.5 TB of storage (based on the user policy settings and HCI policy setting as described above) to the datastore 112, eleven hosts are insufficient to execute the workload in the HCI cluster. Thus, the management system 120 may further determine the number of hosts (e.g., seventeen in this example) that can provide the required storage with the target utilization rate to execute the workload in the HCI cluster. Again, the management system 120 may generate a hardware replacement plan recommending the number of hosts to be included in the HCI cluster to execute the workload by taking into account the required amounts of all (or at least some) computational resources. In this case, the management system 120 may recommend including 17 hosts in the HCI cluster to supply 1.7 TB of memory and 112.5 TB of storage in total. In some embodiments, the management system 120 further selects the 17 hosts (or at least some of them) from the existing hosts in the non-HCI cluster and automatically migrates them to the HCI cluster. Alternatively, the management system 120 may identify new hosts that are not currently in the non-HCI cluster and automatically migrate them to the HCI cluster. Again, the management system 120 may select existing hosts in the non-HCI cluster and/or identify, for migration, new hosts that are not in the non-HCI cluster based on their associated revenues and expenses. For example, if the revenue of an existing host in the non-HCI cluster is smaller than the expense by a predetermined factor (e.g., twice, five times or ten times), the management system 120 (e.g., the migration module 166) may migrate it to the HCI cluster. Upon completion of the host migration, the management module 166 may migrate the workload for the non-HCI cluster to the HCI cluster. It should be noted that the above-described approach may be implemented to migrate a workload and/or a host from an HCI cluster to another HCI cluster. Similarly, this approach may also be implemented to migrate the storage from a non-HCI cluster to an HCI cluster and/or from an HCI cluster to another HCI cluster.

Figure 7:
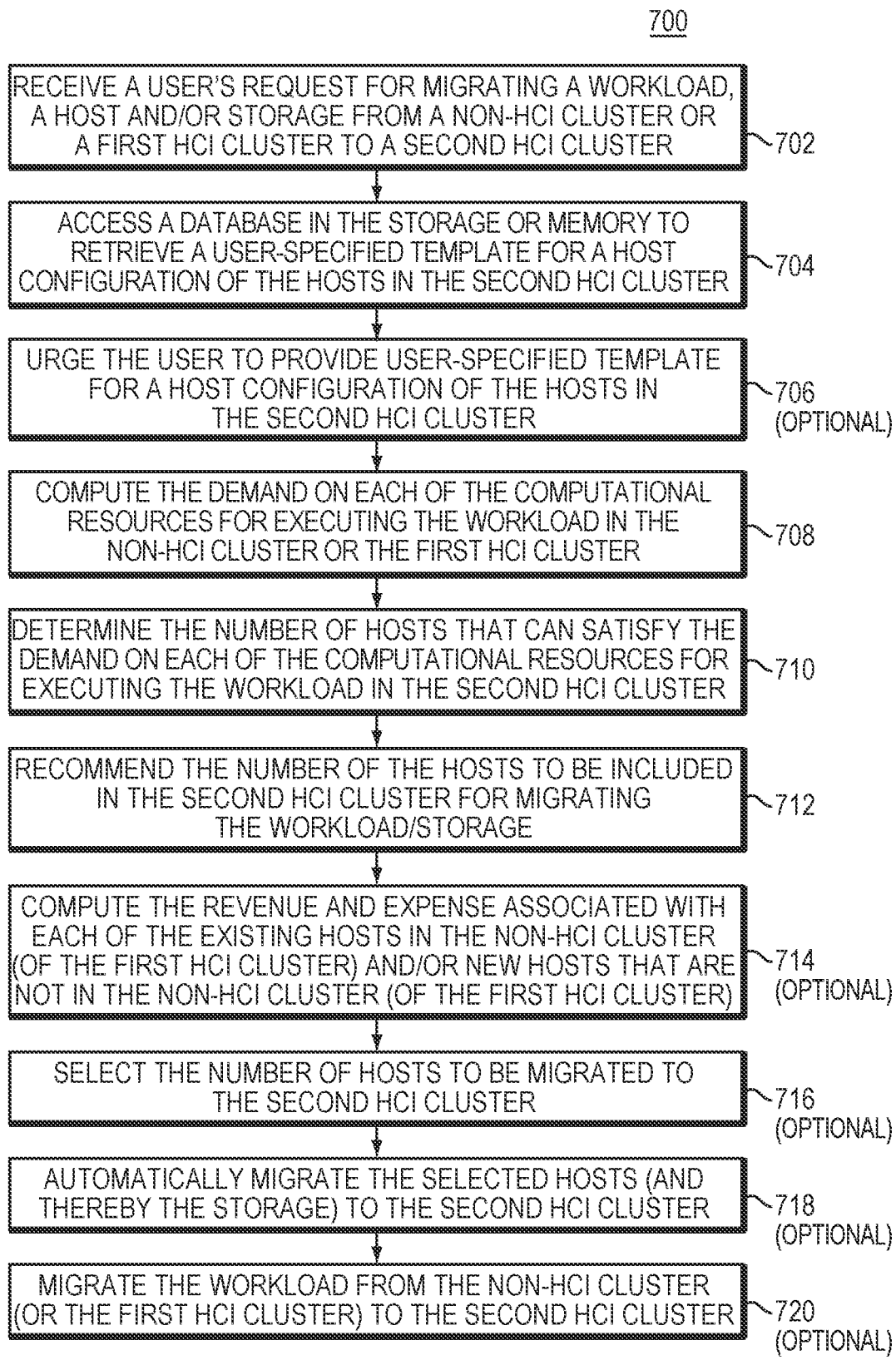
FIG. 7 is a flow chart illustrating an approach for migrating a workload, a host and/or storage from a non-HCI cluster to an HCI cluster or between two HCI clusters in accordance with various embodiments of the present invention.

FIG. 7 is a flow chart illustrating an exemplary approach 700 for migrating a workload, a host and/or storage from a non-HCI cluster and/or a first HCI cluster to a second HCI cluster. In a first step 702, the management system 120 receives a user's request to migrate a workload, a host and/or storage from a non-HCI cluster and/or the first HCI cluster to the second HCI cluster. In response, the management system 120 accesses a database in the storage device 136 or memory 134 to retrieve a user-specified template for a host configuration of the hosts in the second HCI cluster; the template specifies the quantity (e.g., the capacity) of each of the computational resources (e.g., CPU, memory, raw storage amount, IOPS, etc.) provided by the hosts (in a step 704). If such a template is not found in the database, the management system may urge the user to provide it (in a step 706). In some embodiments, the management system 120 (e.g., the resource-computing module 156) then computes the demand on each of the computational resources for executing the workload in the non-HCI cluster and/or the first HCI cluster (in a step 708). Based on the computed demands and the quantities of the computational resources specified in the template, the management system 120 (e.g., the recommendation module 158) determines the number of hosts that can satisfy the demand on each of the computational resources in executing the workload in the second HCI cluster (in a step 710); each computational resource may require a different number of the hosts. The management system 120 (e.g., the recommendation module 158) may then generate a hardware replacement plan recommending the number of hosts to be included in the second HCI cluster to satisfy the required demands on all computational resources to execute the workload (in a step 712). In one embodiment, each computational resource is analyzed individually, and the number of hosts to be included in the second HCI cluster is the greatest of the determined number of hosts associated with each of the required computational resources. Optionally, the management system 120 (e.g., the revenue and expense monitoring module 164) may compute the revenue and expense associated with each of the existing hosts in the non-HCI cluster and/or the first HCI cluster (and/or, in some embodiments, new hosts that are not in the non-HCI cluster and/or the first HCI cluster) (in a step 714). Based thereon, the management system 120 (e.g., the migration module 166) selects the number of hosts (or at least some of them) from the existing hosts in the non-HCI cluster/first HCI cluster and/or new hosts that are not in the non-HCI cluster/first HCI cluster (in a step 716) and automatically migrates the selected hosts (and thereby the storage) to the second HCI cluster (in a step 718). Thereafter, the management system 120 can migrate the workload from the non-HCI cluster and/or first HCI cluster to the second HCI cluster (in a step 720).

In general, the modules including the information-acquisition module 152, user-policy setting module 154, resource-computing module 156, recommendation module 158, resource-scaling module 160, price-querying module 162, revenue and expense monitoring module 164, and migration module 166 described above may be implemented in hardware, software, or a combination of both, whether integrated within the CPU 132, or provided by a separate external processor or other computational entity or entities.

In addition, the manager system 120 may include one or more additional modules implemented in hardware, software, or a combination of both to perform functionality described above. For embodiments in which the functions are provided as one or more software programs, the programs may be written in any of a number of high level languages such as PYTHON, FORTRAN, PASCAL, JAVA, C, C++, C#, BASIC, TENSORFLOW, THEANO, KERAS, PYTORCH, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms "compute resources," "computer resources," "computational resources," and "computing resources" are used herein interchangeably and may include any resources (e.g., the processor, memory, storage, network I/O resource, I/O pathways, etc.) required to execute a computing function or a workload in a cluster. Further, it is to be understood that the features of the various embodiments described herein are not necessarily mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of managing computational resources in a hyperconverged infrastructure (HCI) cluster, the method comprising:
   receiving at least one resource information and at least one policy setting associated with an HCI cluster;
   determining an actual usable storage and a used amount of the actual usable storage in the HCI cluster based on the at least one resource information and the at least one policy setting;
   determining an effective utilization rate of the HCI cluster based on the actual usable storage and the used amount of the actual usable storage;
   in response to determining that the effective utilization rate is above a threshold, determining an additional storage volume and a number of hosts for providing the additional storage volume to the HCI cluster to change the effective utilization rate to be equal to or below the threshold;
   for a respective host of the number of hosts, determining a revenue and an expense for allocating a respective additional storage volume by the respective host to the HCI cluster; and
   in response to determining that the revenue associated with the respective host is greater than the expense associated with the respective host, cloning the respective host in the HCI cluster.

2. The method of claim 1, further comprising, cloning the respective host in the HCI cluster based on determining that the revenue of the respective host is larger than the expense thereof by a predetermined factor.

3. The method of claim 1, wherein the revenue associated with each of the respective hosts is generated by causing a workload to be executed in the HCI cluster using at least one computational resource, and the expense associated with each of the respective hosts is generated by allocating the at least one computational resource from the respective host to the HCI cluster for executing the workload.

4. The method of claim 3, wherein the revenue associated with each of the respective hosts is determined based at least in part on a unit price associated with the at least one computational resource and a quantity of the at least one computational resource contributed from each of the respective hosts to the HCI cluster.

5. The method of claim 3, wherein the at least one computational resource is selected from the group consisting of a processor, a memory, a storage I/O resource, a network I/O resource, and I/O pathways.

6. The method of claim 1, wherein the revenue and/or expense associated with the respective host is determined based on an average of the revenue and/or expense over a predetermined period of time.

7. The method of claim 1, wherein the revenue associated with each of the respective hosts is generated by causing a workload to utilize the respective additional storage volume contributed by the respective host and the expense associated with each of the respective hosts is generated by allocating the respective additional storage volume from the respective host to a datastore in the HCI cluster.

8. The method of claim 7, wherein the respective additional storage volume comprises at least one of a storage amount or an input/output operations per second (IOPS) capacity.

9. A computer system for managing computational resources in a hyperconverged infrastructure (HCI) cluster, comprising:
   one or more processors, one or more computer-readable memories, one or more computer- readable tangible storage media, and program instructions stored on at least one of the one or more computer-readable tangible storage media for execution by at least one of the one or more processors via at least one of the one or more memories, wherein the computer system is capable of performing a method comprising:
   receiving at least one resource information and at least one policy setting associated with an HCI cluster;
   determining an actual usable storage and a used amount of the actual usable storage in the HCI cluster based on the at least one resource information and the at least one policy setting;
   determining an effective utilization rate of the HCI cluster based on the actual usable storage and the used amount of the actual usable storage;
   in response to determining that the effective utilization rate is above a threshold, determining an additional storage volume and a number of hosts for providing the additional storage volume to the HCI cluster to change the effective utilization rate to be equal to or below the threshold;
   for a respective host of the number of hosts, determining a revenue and an expense for allocating a respective additional storage volume by the respective host to the HCI cluster; and
   in response to determining that the revenue associated with the respective host is greater than the expense associated with the respective host, cloning the respective host in the HCI cluster.

10. The computer system of claim 9, further comprising, cloning the respective host in the HCI cluster based on determining that the revenue of the respective host is larger than the expense thereof by a predetermined factor.

11. The computer system of claim 9, wherein the revenue associated with each of the respective hosts is generated by causing a workload to be executed in the HCI cluster using at least one computational resource, and the expense associated with each of the respective hosts is generated by allocating the at least one computational resource from the respective host to the HCI cluster for executing the workload.

12. The computer system of claim 11, wherein the revenue associated with each of the respective hosts is determined based at least in part on a unit price associated with the at least one computational resource and a quantity of the at least one computational resource contributed from each of the respective hosts to the HCI cluster.

13. The computer system of claim 11, wherein the at least one computational resource is selected from the group consisting of a processor, a memory, a storage I/O resource, a network I/O resource, and I/O pathways.

14. The computer system of claim 9, wherein the revenue and/or expense associated with the respective host is determined based on an average of the revenue and/or expense over a predetermined period of time.

15. The computer system of claim 9, wherein the revenue associated with each of the respective hosts is generated by causing a workload to utilize the respective additional storage volume contributed by the respective host and the expense associated with each of the respective hosts is generated by allocating the respective additional storage volume from the respective host to a datastore in the HCI cluster.

16. The computer system of claim 15, wherein the respective additional storage volume comprises at least one of a storage amount or an input/output operations per second (IOPS) capacity.

* * * * *